(12) United States Patent
Sakai

(10) Patent No.: US 7,107,541 B2
(45) Date of Patent: Sep. 12, 2006

(54) INFORMATION PROCESSING APPARATUS AND METHOD, RECORDING MEDIUM, AND PROGRAM

(75) Inventor: Toshiyuki Sakai, Kanagawa (JP)

(73) Assignee: Sony Corporation, Tokyo (JP)

(*) Notice: Subject to any disclaimer, the term of this patent is extended or adjusted under 35 U.S.C. 154(b) by 805 days.

(21) Appl. No.: 10/319,643

(22) Filed: Dec. 16, 2002

(65) Prior Publication Data

US 2003/0128237 A1  Jul. 10, 2003

(30) Foreign Application Priority Data

Dec. 20, 2001 (JP) ............................. 2001-387920

(51) Int. Cl.
*G06F 15/00* (2006.01)
*G06F 13/00* (2006.01)

(52) U.S. Cl. ................. 715/748; 715/736; 715/728

(58) Field of Classification Search ............... 715/746, 715/748, 715, 764, 719, 728, 856

See application file for complete search history.

(56) References Cited

U.S. PATENT DOCUMENTS

| | | | | |
|---|---|---|---|---|
| 5,832,510 | A | * | 11/1998 | Ito et al. ...................... 707/201 |
| 6,538,675 | B1 | * | 3/2003 | Aratani et al. ............... 715/856 |
| 2003/0020757 | A1 | * | 1/2003 | Aratani et al. ............... 345/790 |

* cited by examiner

*Primary Examiner*—Cao (Kevin) Nguyen
(74) *Attorney, Agent, or Firm*—Oblon, Spivak, McClelland, Maier & Neustadt, P.C.

(57) ABSTRACT

A message object corresponding to an input voice signal moves upward as time passes, like a bubble, after the voice signal is input. Accordingly, the user can recognize the input data easily and intuitively. The user selects a desired recognized message object and drags and drops the message object to a desired destination object. In this way, the user can transmit a voice signal associated with the message object to the terminal corresponding to the destination object.

16 Claims, 25 Drawing Sheets

| ADDRESS | COLOR | ID OF DESTINATION OBJECT | NAME OF FILE |
|---|---|---|---|
| ADDRESS OF TERMINAL 2-1 | BLUE | X X X X | X X X |
| ADDRESS OF TERMINAL 2-2 | RED | X X X X | X X X |
| ADDRESS OF TERMINAL 2-3 | YELLOW | X X X X | X X X |
| ⋮ | ⋮ | ⋮ | ⋮ |

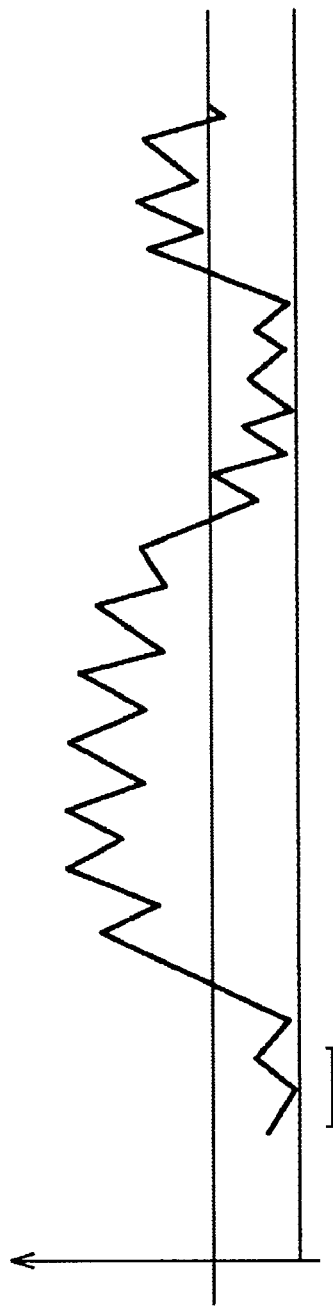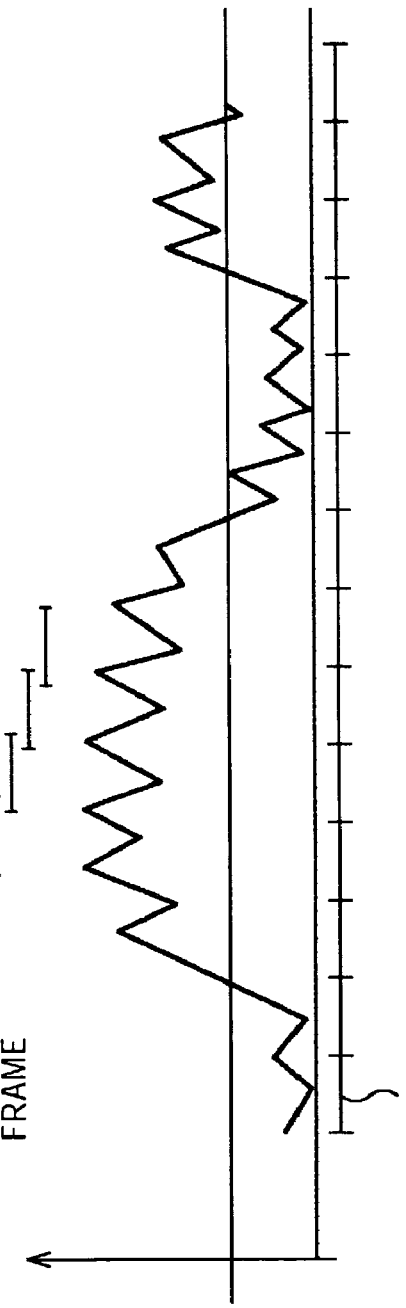

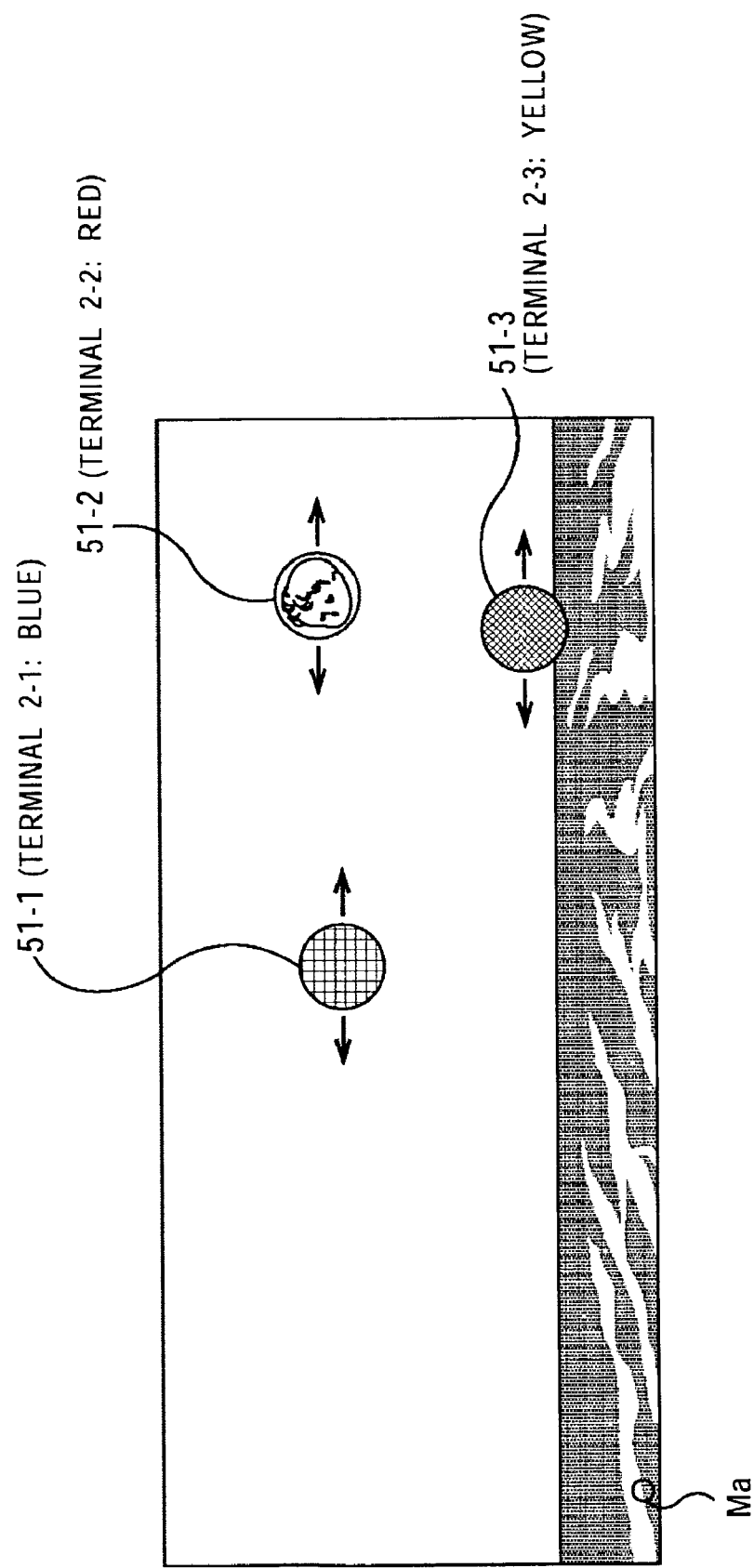

M

A
B

INFORMATION PROCESSING APPARATUS AND METHOD, RECORDING MEDIUM, AND PROGRAM

BACKGROUND OF THE INVENTION

1. Field of the Invention

The present invention relates to an information processing apparatus and method, a recording medium, and a program. In particular, the present invention relates to an information processing apparatus and method, a recording medium, and a program, in which a preferable method for information processing can be provided.

2. Description of the Related Art

A personal computer can perform various processes by using text data input via a keyboard or voice data captured by a microphone. The input data can be transmitted as a message to another personal computer through a network.

The message input to the personal computer is, for example, stored in a file. When the user transmits the message, he or she has to recognize the file containing the message from the file name so as to read the message. Also, a received message is stored in a file. Thus, when the user reads the message, he or she has to recognize the file containing the message from the file name so as to read out the message.

That is, in known arts, a user cannot easily and intuitively recognize data (message) used in a personal computer from the display mode of an icon of a file, and thus cannot perform a series of processes easily.

SUMMARY OF THE INVENTION

The present invention has been made in view of this state, and it is an object of the present invention to provide a method in which the user can recognize data used in a personal computer easily and intuitively so as to perform a series of processes easily.

An information processing apparatus of the present invention comprises: a first detecting unit for detecting input of first information; a first display control unit which displays a first object corresponding to the first information when the first detecting unit detects input of the first information and which changes the display mode of the first object in accordance with the amount of data of the first information; a second display control unit for changing the display mode of the first object displayed by the first display control unit in accordance with elapsed time from a predetermined time; a first associating unit for associating the first information with the first object; and a transmitting unit for transmitting the first information associated with the first object to a communication apparatus. Herein, the object is visual related data.

The first information may be a voice signal captured by a microphone or text data input via an operation unit. Alternatively, the first information may be content such as a moving picture obtained by an image pickup device such as a CCD.

The information processing apparatus may further comprise: a third display control unit for displaying a second object corresponding to the communication apparatus; and a second detecting unit for detecting the second object to which the first object is dragged and dropped. The transmitting unit can transmit the first information associated with the dragged and dropped first object to the communication apparatus corresponding to the second object detected by the second detecting unit.

The third display control unit can display the second object such that a color allocated with the communication apparatus is attached to the second object.

The information processing apparatus may further comprise a third detecting unit for detecting a predetermined state of the communication apparatus. The third display control unit can display the second object in a display mode based on a detection result generated by the third detecting unit.

The third detecting unit can detect whether or not the communication apparatus can communicate with the information processing apparatus.

The information processing apparatus further comprises: a fourth display control unit for displaying a third object corresponding to additional information; and an adding unit which detects the third object to which the first object is dragged and dropped and which adds the additional information corresponding to the detected third object to the first information associated with the first object, which is dragged and dropped to the third object. The transmitting unit can transmit the first information associated with the first object and the additional information added thereto to the communication apparatus corresponding to the second object detected by the second detecting unit.

The information processing apparatus further comprises: a second associating unit which receives second information transmitted from the communication apparatus and which associates the received second information with the second object corresponding to the communication apparatus which has transmitted the second information; a selecting unit for selecting the second object corresponding to the communication apparatus; and a reproducing unit for reproducing the second information associated with the second object selected by the selecting unit.

The third display control unit can change the display mode of the second object when the second information is associated with the second object by the second associating unit.

The third display control unit can display the second object in a display mode according to the number of times the second information is associated with the second object by the second associating unit.

The third display control unit can display the second object in a display mode according to the number of pieces of the second information which have not been reproduced by the reproducing unit among the second information associated with the second object by the second associating unit.

The information processing apparatus further comprises a communication status detecting unit for detecting the communication status between the communication apparatus and another communication apparatus. The third display control unit can display the second object in a display mode based on a detection result generated by the communication status detecting unit.

An information processing method of the present invention comprises: a first detection-control step of controlling detection of input of first information; a first display-control step of displaying a first object corresponding to the first information when input of the first information is detected in the first detection-control step and of changing the display mode of the first object in accordance with the amount of data of the first information; a second display-control step of changing the display mode of the first object displayed in the first display-control step in accordance with elapsed time from a predetermined time; a first associating step of associating the first information with the first object; and a transmission-control step of controlling transmission of the first information associated with the first object to a communication apparatus.

The information processing method further comprises: a third display-control step of displaying a second object corresponding to the communication apparatus; and a second detection-control step of detecting the second object to which the first object is dragged and dropped. In the transmission-control step, the first information associated with the dragged and dropped first object can be transmitted to the communication apparatus corresponding to the second object detected in the second detection-control step.

Also, the information processing method further comprises: a fourth display-control step of displaying a third object corresponding to additional information; and an adding step of detecting the third object to which the first object is dragged and dropped and of adding the additional information corresponding to the detected third object to the first information associated with the first object, which is dragged and dropped to the third object. In the transmission-control step, the first information associated with the first object and the additional information added thereto can be transmitted to the communication apparatus corresponding to the second object detected in the second detection-control step.

A program of the present invention allows a computer to execute a process comprising: a detection-control step of controlling detection of input of first information; a first display-control step of displaying a first object corresponding to the first information when input of the first information is detected in the detection-control step and of changing the display mode of the first object in accordance with the amount of data of the first information; a second display-control step of changing the display mode of the first object displayed in the first display-control step in accordance with elapsed time from a predetermined time; a first association-controlling step of associating the first information with the first object; and a transmission-control step of controlling transmission of the first information associated with the first object to a communication apparatus.

In the information processing apparatus and method and the program of the present invention, the first object corresponding to the first information is displayed when the input of the first information is detected, and the display mode of the first object is changed in accordance with the amount of data of the first information. Also, the display mode of the first object is changed in accordance with elapsed time from a predetermined time, the first information is associated with the first object, and the first information associated with the first object is transmitted to the communication apparatus. Accordingly, the user can obtain the transmitted first information intuitively.

BRIEF DESCRIPTION OF THE DRAWINGS

FIGS. 8A and 8B show the configuration of frames;

FIG. 9 shows another display example of the communication page;

DESCRIPTION OF THE PREFERRED EMBODIMENTS

Figure 1:
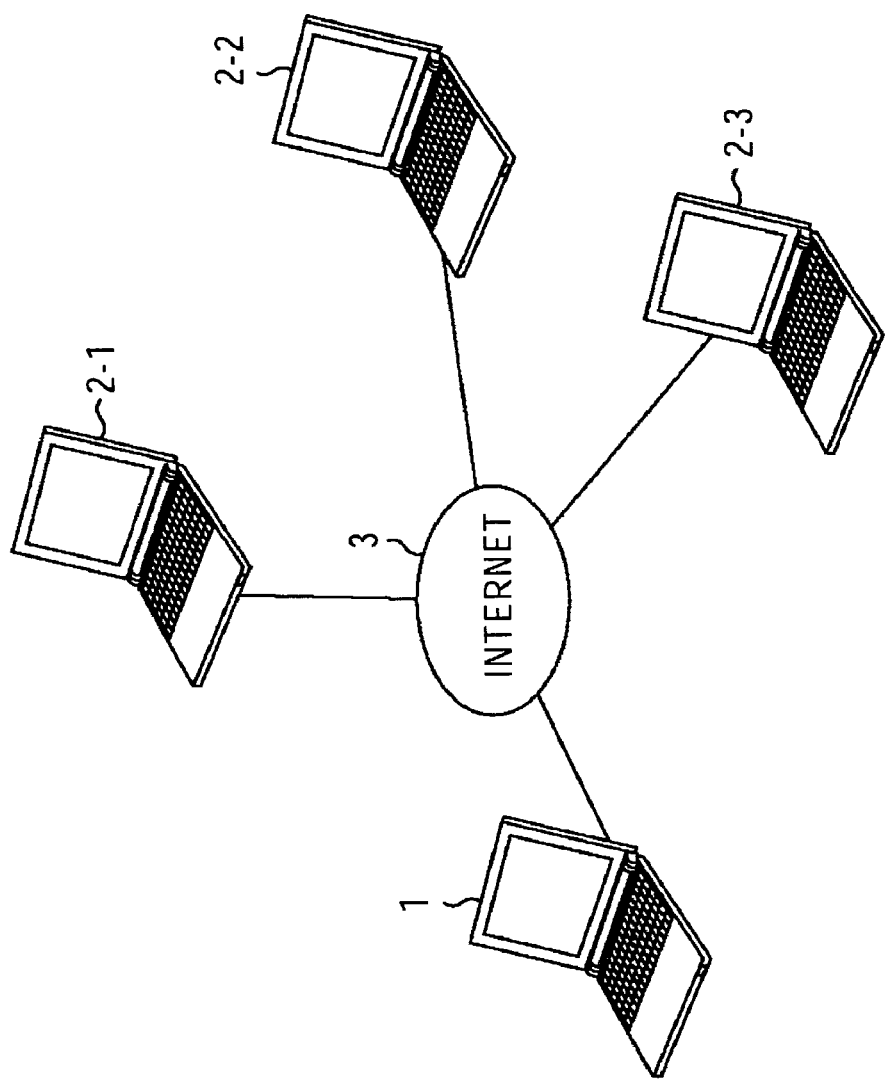
FIG. 1 shows an example of the use of a terminal according to the present invention.

FIG. 1 shows an example of the use of a terminal 1 according to the present invention.

The user of the terminal 1 transmits/receives a message to/from the users of terminals 2-1 to 2-3 through the Internet 3. In this case, an operation page (described later) in which the communication status can be recognized more easily and intuitively is used. Herein, the terminal 1 transmits a voice message input by the user to the terminal 2, and the terminal 1 also receives a voice message from the terminal 2 and outputs the received message.

Figure 2:
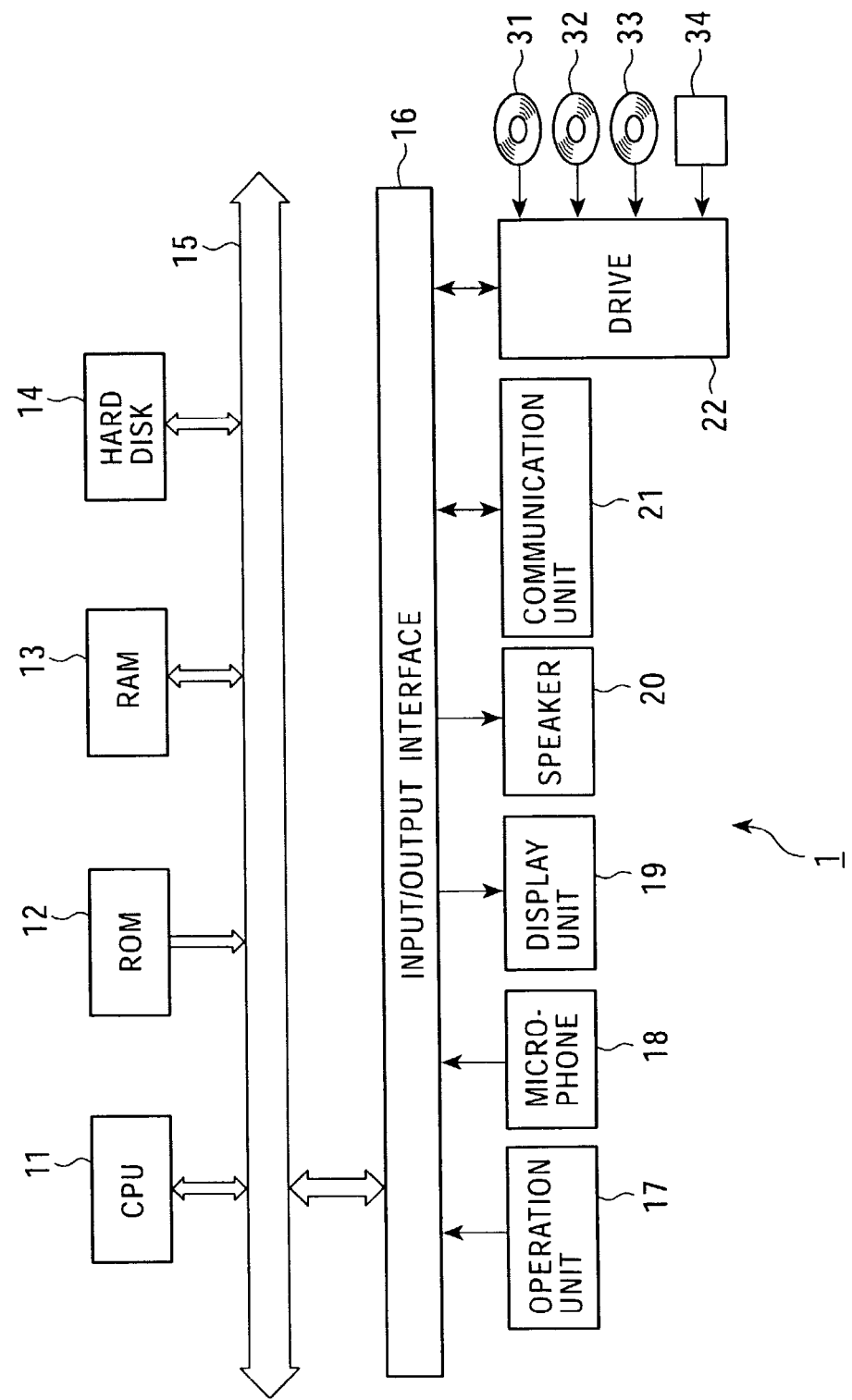
FIG. 2 is a block diagram showing an example of the configuration of the terminal shown in FIG. 1.

FIG. 2 shows an example of the configuration of the terminal 1. A central processing unit (CPU) 11 is connected to an input/output interface 16 through a bus 15. When the user inputs a command by using an operation unit 17, including a keyboard and a mouse, so that the command is transmitted to the CPU 11 through the input/output interface 16, the CPU 11 loads a program (communication program) into a random access memory (RAM) 13 and executes the program. The program is stored, for example, in a read only memory (ROM) 12, a hard disk 14, or a recording medium loaded in a drive 22, such as a magnetic disk 31, an optical disk 32, a magnetooptical disk 33, or a semiconductor memory 34. Further, the CPU 11 outputs the result of the process to a display unit 19, including a liquid crystal display (LCD), through the input/output interface 16 as required.

A microphone 18 captures voice signals and supplies the obtained voice signals to the CPU 11. A speaker 20 outputs the voice signals from the CPU 11. A communication unit 21 performs communication with the terminal 2 through the Internet 3.

Figure 3:
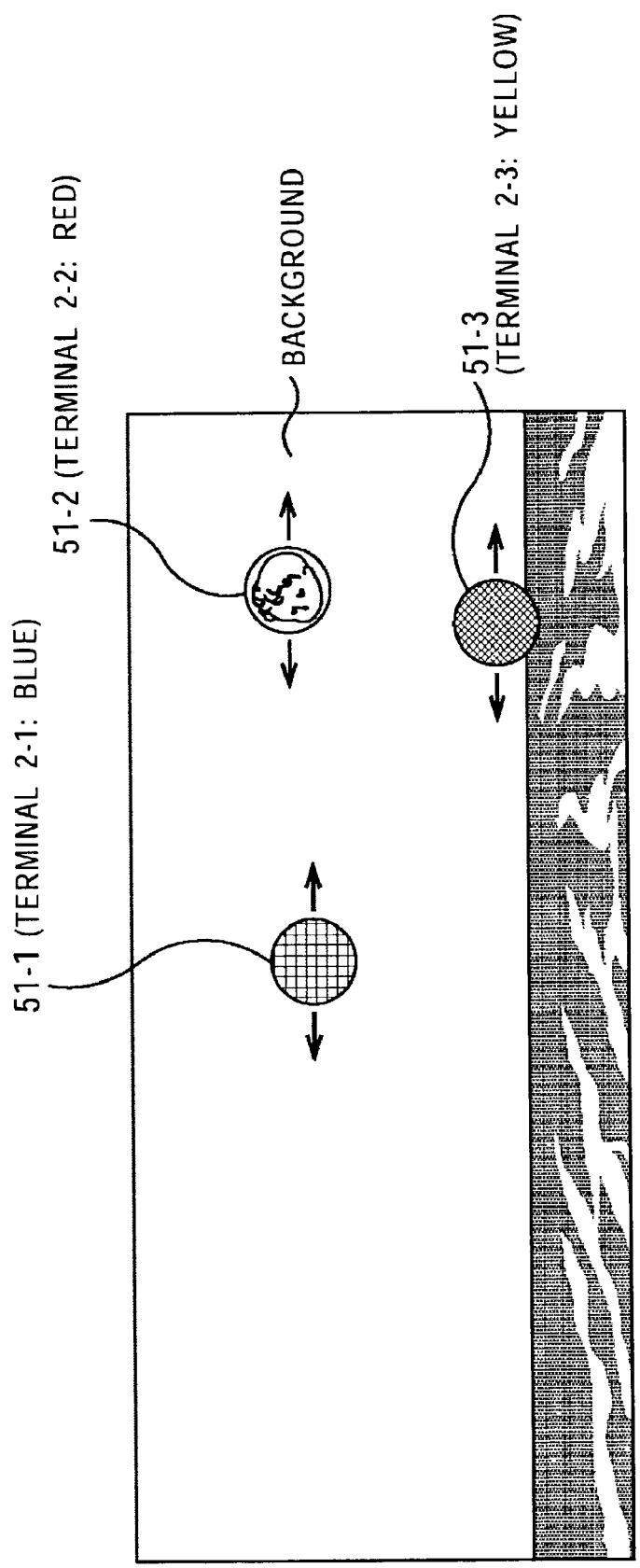
FIG. 3 shows a display example of a communication page.

FIG. 3 shows an operation page (hereinafter, referred to as a communication page) which is displayed on the display unit 19 of the terminal 1 when the terminal 1 communicates with the terminal 2. In this example, a background of the sea and destination objects 51-1 to 51-3 (hereinafter referred to as a destination object 51 when the objects need not be distinguished from each other-this is the same other cases) represented by balls floating in the sea are displayed in the communication page in an initial state. The destination object 51 represents the terminal 2, which is registered as the destination for the terminal 1, the destination object 51-1 represents the terminal 2-1, the destination object 51-2 represents the terminal 2-2, and the destination object 51-3 represents the terminal 2-3.

Then, the communication program is started. Hereinafter, the operation of the terminal 1 for displaying the initial state of the communication page shown in FIG. 3 on the display unit 19 will be described with reference to the flowchart in FIG. 4.

When the communication program stored in the ROM 12 is started in step S1, the CPU 11 controls the display unit 19 so as to display the background shown in FIG. 3 in step S2.

Then, in step S3, the CPU 11 determines whether or not there is a terminal (terminal 2) registered as a destination, with predetermined information thereof being set in a registration management table (described later) stored in the hard disk 14. If it is determined that no terminal is registered, the process proceeds to step S4.

Figures 5, 6:
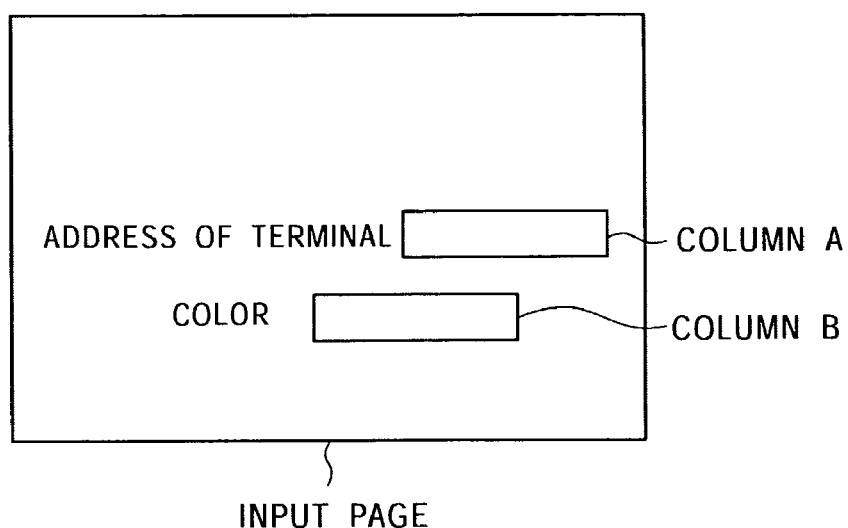
FIG. 5 shows a display example of an input page.
FIG. 6 shows an example of a registration management table.

In step S4, the CPU 11 controls the display unit 19 so as to display an input page used for inputting registration information of a destination, as shown in FIG. 5.

The account (in this example, mail address) of the user of a terminal (in this example, terminal 2-1, 2-2, or 2-3) to be registered as a destination can be input in a column A. The color (blue, red, yellow, and so on) to be allocated to the terminal 2, which is to be registered as a destination, can be input in a column B. Hereinafter, the input address and color are referred to as registration information.

In step S5, the CPU 11 determines whether or not registration information is input into the input page shown in FIG. 5. If it is determined that the information is input, the process proceeds to step S6, where the input registration information is set and stored in the registration management table stored in the hard disk 14. In this way, the terminal 2 is registered as a destination.

FIG. 6 shows an example of setting in the registration management table. The address and color of each of the terminals 2-1 to 2-3 input via the input page (FIG. 5) are set in the registration management table. The ID and the file name of the destination object 51 will be described later.

When it is determined that a destination is registered in step S3, or when a destination is registered in step S6, the process proceeds to step S7, where the CPU 11 reads the addresses of the terminals 2-1 to 2-3 registered as destinations from the registration management table stored in the hard disk 14, tries to access the terminals through the communication unit 21, and determines whether or not the terminal 2 can communicate with the terminal 1.

Then, in step S8, the CPU 11 generates the destination object 51 corresponding to the terminal 2 registered as a destination based on the color set in the registration management table stored in the hard disk 14 and on the result obtained by checking the communication status in step S7, and controls the display unit 19 so as to display the destination object 51 at a predetermined position in a display mode shown in FIG. 3. In this case, blue, red, and yellow are set in the registration management table according to the addresses of the terminals 2-1 to 2-3, respectively. Thus, the destination object 51-1 corresponding to the terminal 2-1 is blue, the destination object 51-2 corresponding to the terminal 2-2 is red, and the destination object 51-3 corresponding to the terminal 2-3 is yellow. Also, since the terminal 2-2 cannot communicate with the terminal 1, an image of a sleeping person is displayed at the destination object 51-2 corresponding to the terminal 2-2.

The position of each destination object 51 may be arbitrarily set or may be specified.

Accordingly, the user can recognize the destination corresponding to the destination object 51 by color and can recognize whether or not the terminal can perform communication by the displayed image.

In this example, it is detected whether or not the terminal 2 can communicate with the terminal 1. If the terminal 2 cannot communicate with the terminal 1, the destination object 51 is displayed so as to indicate that fact (a sleeping person is displayed). However, even if the terminal 2 can communicate with the terminal 1 but if the terminal 2 is busy because a plurality of application programs are being operated and various processes are being performed in the terminal 2, the destination object 51 can be displayed in a display mode indicating that fact. Accordingly, the user can expect that he or she may not receive an immediate response when the user transmits a message.

In step S9, the CPU 11 controls the display unit 19 so as to move each destination object 51 alternately in the direction of arrows shown in FIG. 3, and a step for swaying the destination object 51 is started. That is, a process for moving the destination object 51 to a position corresponding to the elapsed time is started. Accordingly, the destination object 51 is displayed such that it sways horizontally, and thus the user can see that the destination object 51 is like a ball floating in the sea. Alternatively, the destination object 51 may be wiggled randomly in all directions.

The process is completed when registration information is not input in step S5 or when a display step is started n step S9.

In this way, the communication page is displayed on the display unit 19 of the terminal 1.

Next, the operation of the terminal 1 for inputting a voice message will be described with reference to the flowchart in FIG. 7.

Figure 4:
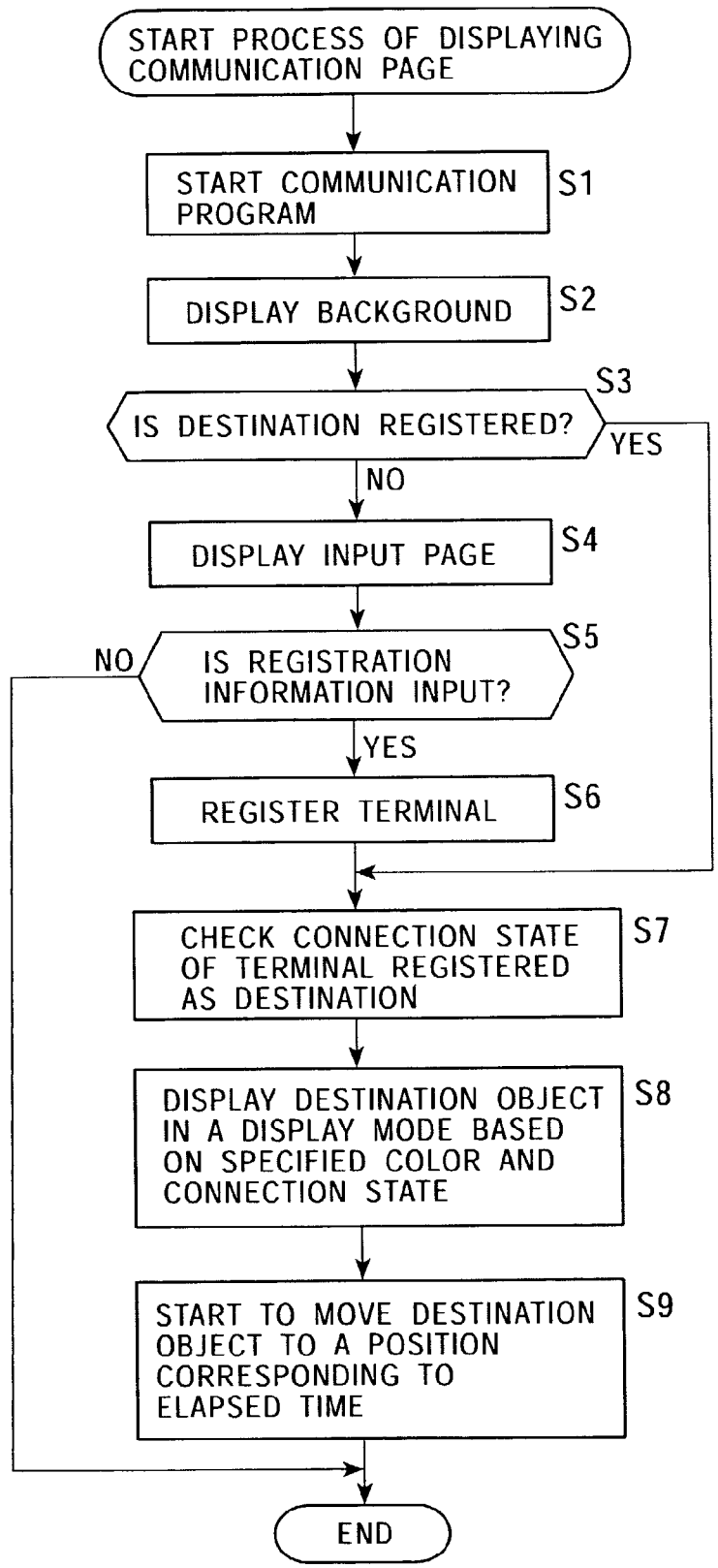
FIG. 4 is a flowchart for illustrating a process of displaying the communication page.

After the process shown in the flowchart in FIG. 4 has been performed and the communication page shown in FIG. 3 is displayed, the CPU 11 of the terminal 1 calculates an average volume based on voice signals of one frame captured by the microphone 18 in step S21. Frames may be formed such that parts of signals overlap with each other, as shown in FIG. 8A. Alternatively, frames may be formed such that signals do not overlap with each other, as shown in FIG. 8B.

Then, in step S22, the CPU 11 determines whether or not the average volume obtained in step S21 is larger than a predetermined threshold. If it is determined that the average volume is equal to or less than the threshold, the process returns to step S21. On the other hand, if it is determined that the average volume surpasses the threshold in step S22, the process proceeds to step S23, where the CPU 11 starts a process for recording a voice signal captured by the microphone 18 in the hard disk 14. That is, the speech of the user is detected in step S22, and then recording of the voice signal is started in step S23.

Next, in step S24, the CPU 11 controls the display unit 19 so as to display a message object Ma having a predetermined size (diameter) at a predetermined position (at the lower left corner in FIG. 9), as shown in FIG. 9.

In step S25, the CPU 11 calculates an average volume based on signals of one frame which are subsequently input. Then, in step S26, it is determined whether or not the obtained average volume surpasses the threshold.

If it is determined that the average volume surpasses the threshold in step S26, that is, when the speech of the user is continuously input, the process proceeds to step S27, where the CPU 11 controls the display unit 19 so as to increment a counter included therein by a predetermined value W. Then, in step S28, the size of the message object Ma displayed in step S24 is changed to a size based on the value of the counter at that time and is displayed. Then, the process returns to step S25, and steps S25 to S28 are repeatedly performed until it is determined that the average volume is equal to or less than the threshold in step S26, that is, until the user stops (or stops temporarily) inputting speech.

As described above, steps S25 to S28 are repeatedly performed with respect to the speech of the user which is continuously input. Thus, the diameter of the message object Ma increases in accordance with the time for which the speech is input.

When it is determined that the average volume is equal to or less than the threshold in step S26, that is, when the user stops (or stops temporarily) inputting speech, the process proceeds to step S29, where the CPU 11 stops recording the voice signal, which was started in step S23. At this time, the message object Ma having a diameter which is changed in step S28 is displayed on the communication page. For example, the message object Ma whose diameter is larger than in FIG. 9 is displayed, as shown in FIG. 10.

Next, in step S30, the CPU 11 allocates an ID to the message object Ma and associates the signal (voice data) which was recorded from step S23 to step S29 with the message object Ma. More specifically, for example, the ID of the message object Ma is associated with the name of the file containing the associated voice data so that the ID and the name of the file are stored.

Then, the process is completed. The voice input process is repeatedly performed with a predetermined timing.

Figure 7:
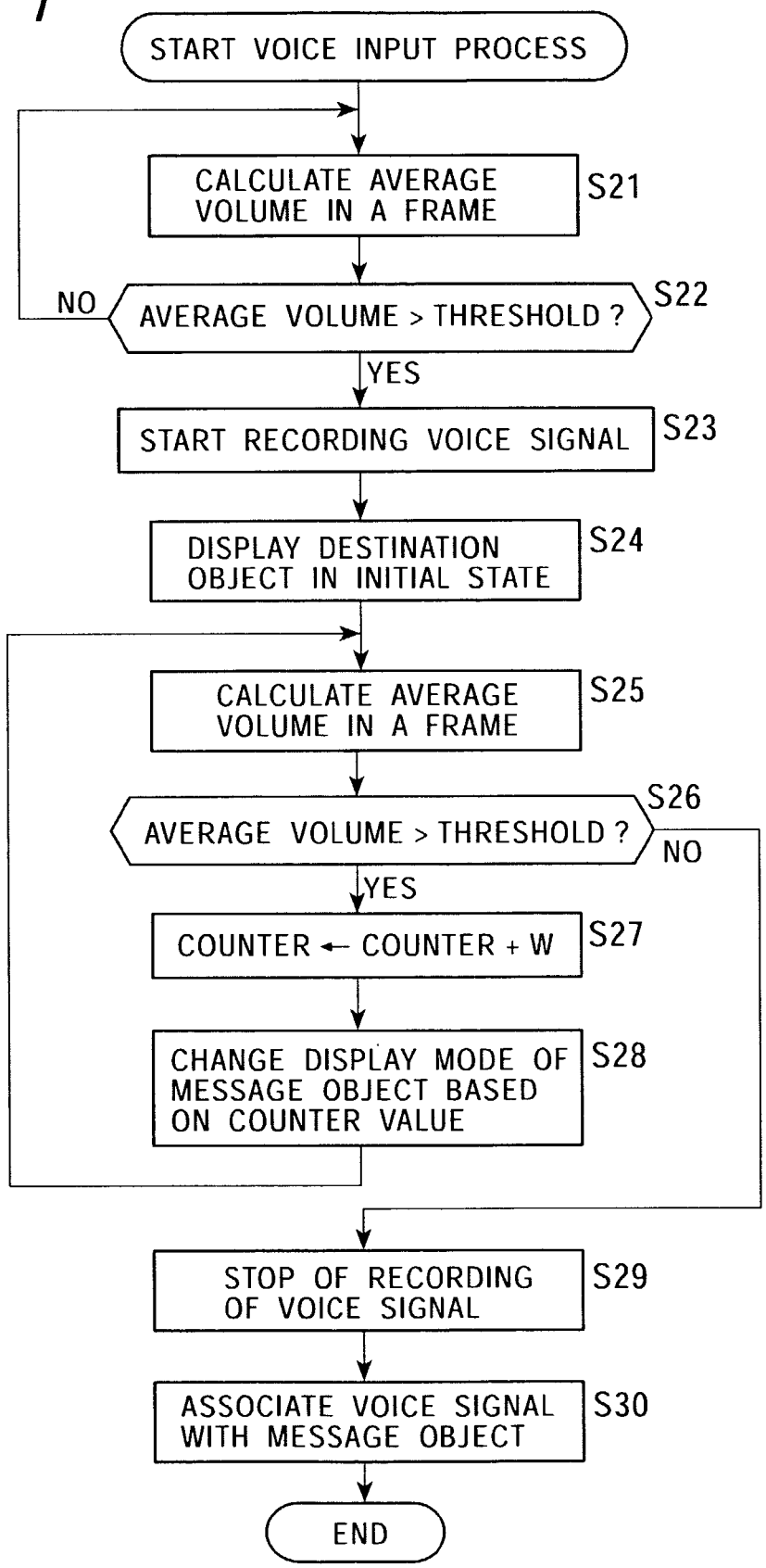
FIG. 7 is a flowchart for illustrating a voice input process.
Figure 10:
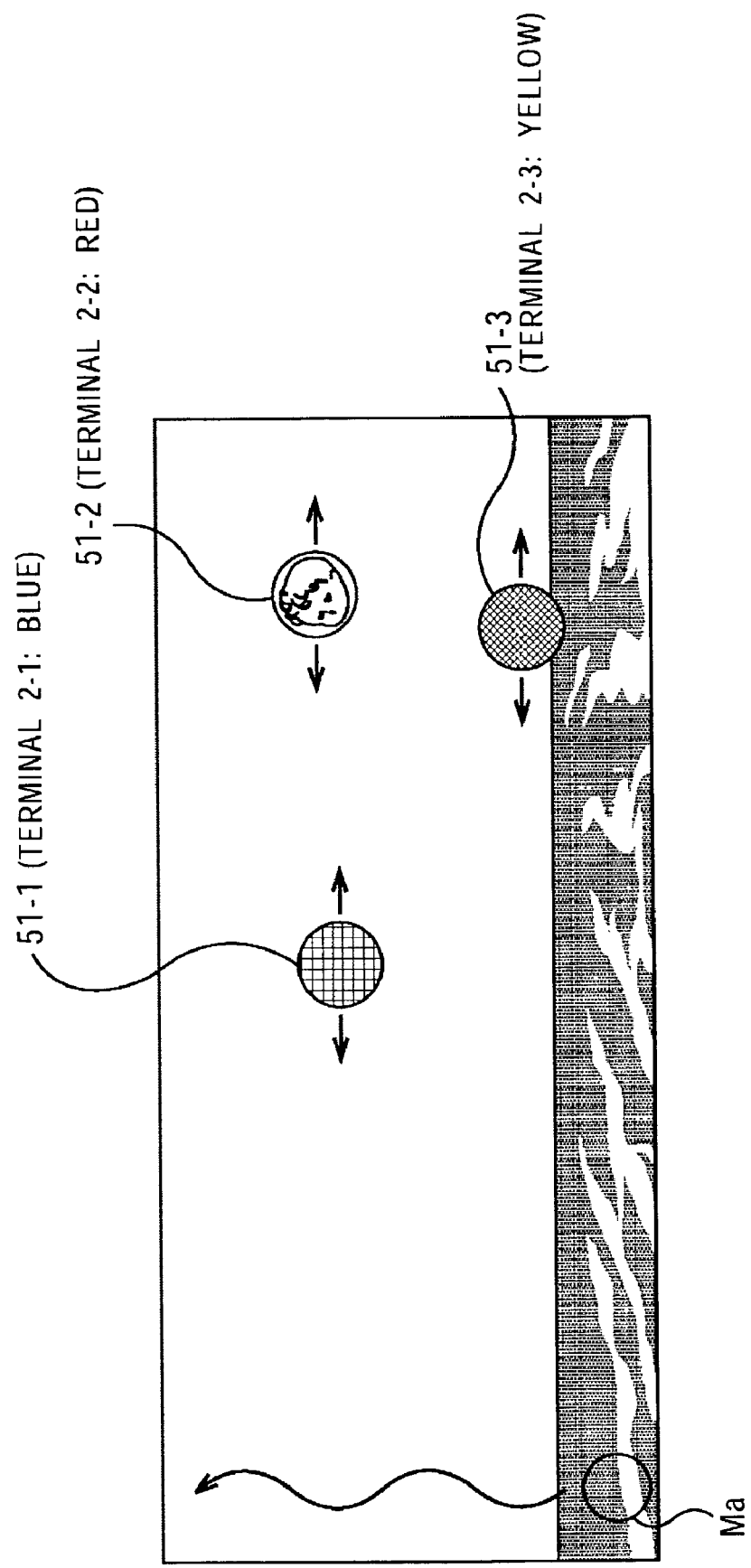
FIG. 10 shows another display example of the communication page.

In the process shown in the flowchart in FIG. 7, the message object Ma displayed as shown in FIG. 10 moves upward while swaying horizontally, as indicated by an upward arrow in FIG. 10. Accordingly, the user can see that the message object Ma is like a bubble moving in the sea. Next, the process of displaying (moving) such a message object Ma will be described with reference to the flowchart in FIG. 11.

In step S41, the CPU 11 of the terminal 1 starts a timer t included therein.

Then, in step S42, the CPU 11 calculates the elapsed time from the start based on the time of the timer t and controls the display unit 19 so as to move the message object Ma to a position corresponding to the elapsed time. That is, the message object Ma is moved to a predetermined position along the upward arrow in FIG. 10.

In step S43, the CPU 11 determines whether or not the position corresponding to the elapsed time is past the top of the communication page. If it is determined that the position is not past the top, the process returns to step S42 so as to repeatedly perform the subsequent steps. Accordingly, in the case of FIG. 10, the message object Ma can be moved upward while being swayed horizontally in accordance with the passage of time.

When it is determined that the position corresponding to the elapsed time is past the top of the communication page in step S43, the process proceeds to step S44, where the CPU 11 controls the display unit 19 so as to stop displaying the message object Ma. That is, the message object Ma disappears from the communication page. Then, the process is completed.

The above-described display process is performed every time the message object M is generated by the voice input process (FIG. 7).

Figure 11:
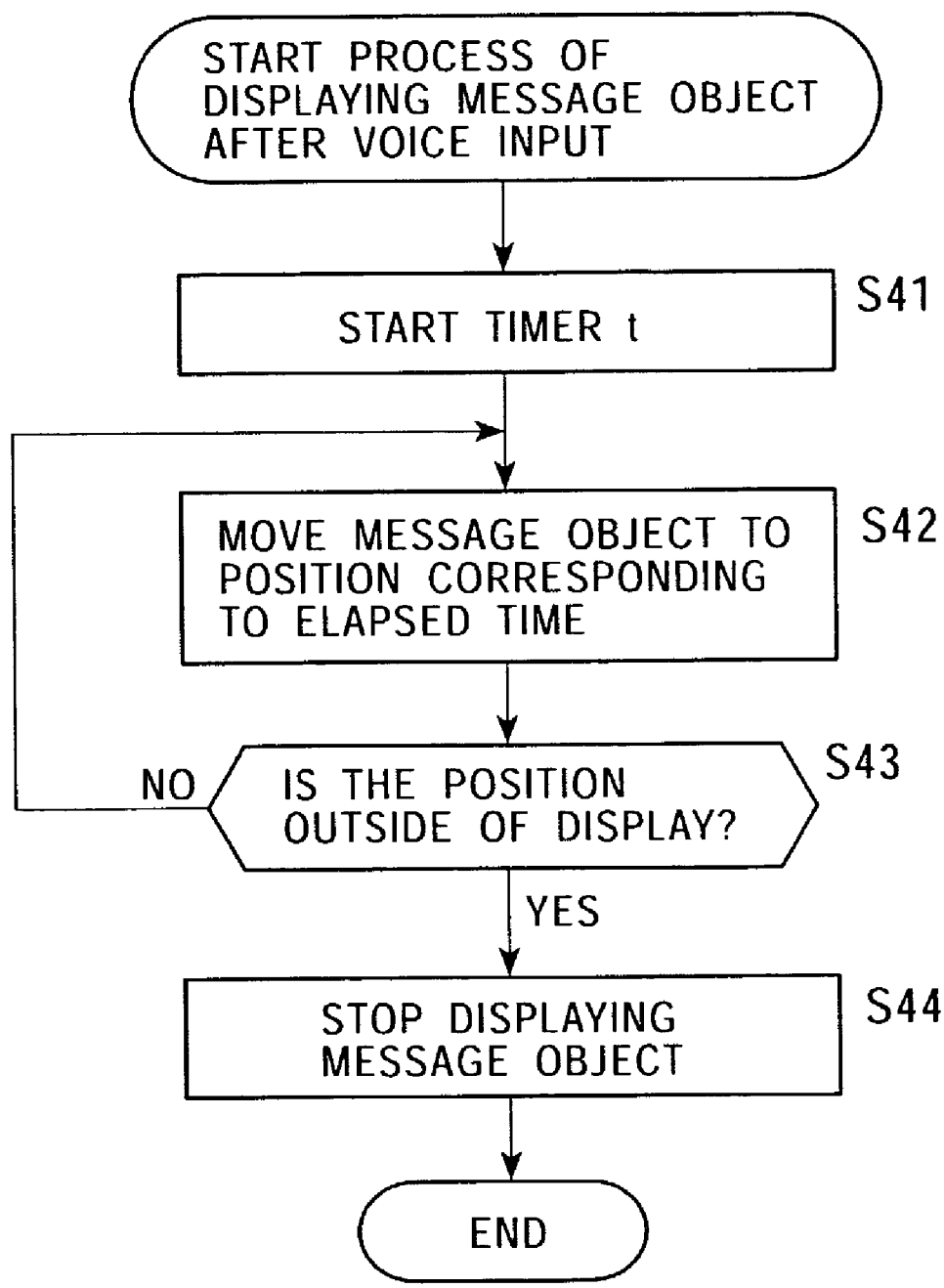
FIG. 11 is a flowchart for illustrating a process of displaying a message object after voice input.
Figure 12:
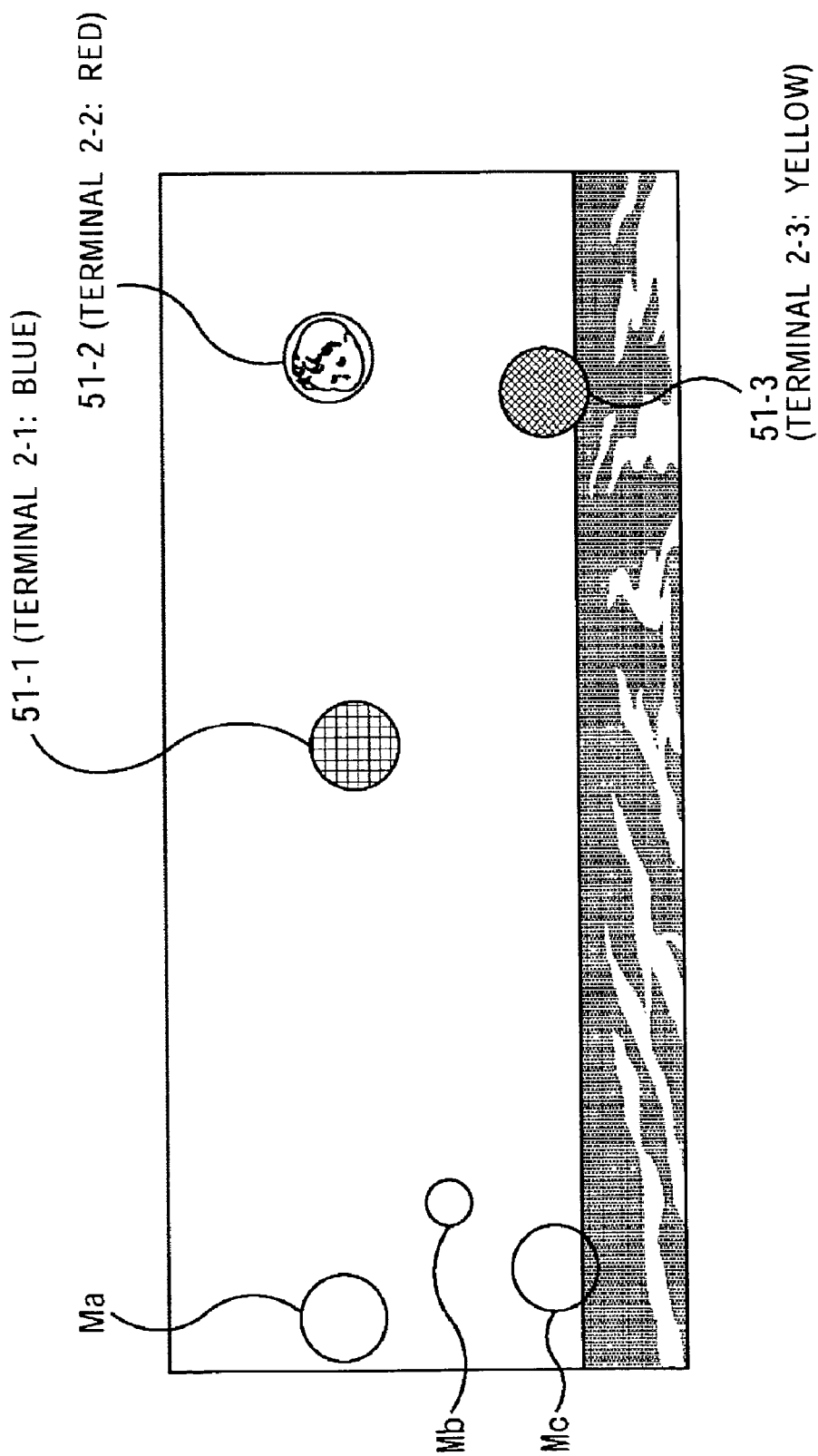
FIG. 12 shows another display example of the communication page.

For example, when the user intermittently inputs speech to the terminal 1, the voice input process shown in FIG. 7 and the display process shown in FIG. 11 are performed as required in accordance with voice input. Thus, as shown in FIG. 12, a plurality of message objects M are displayed such that they move upward in the communication page. In an example shown in FIG. 12, message objects Mb and Mc, which are generated later than the message object Ma, are displayed. In this way, by representing each of the message objects M generated at different time as a bubble, the user can recognize input data easily and intuitively.

Figure 13:
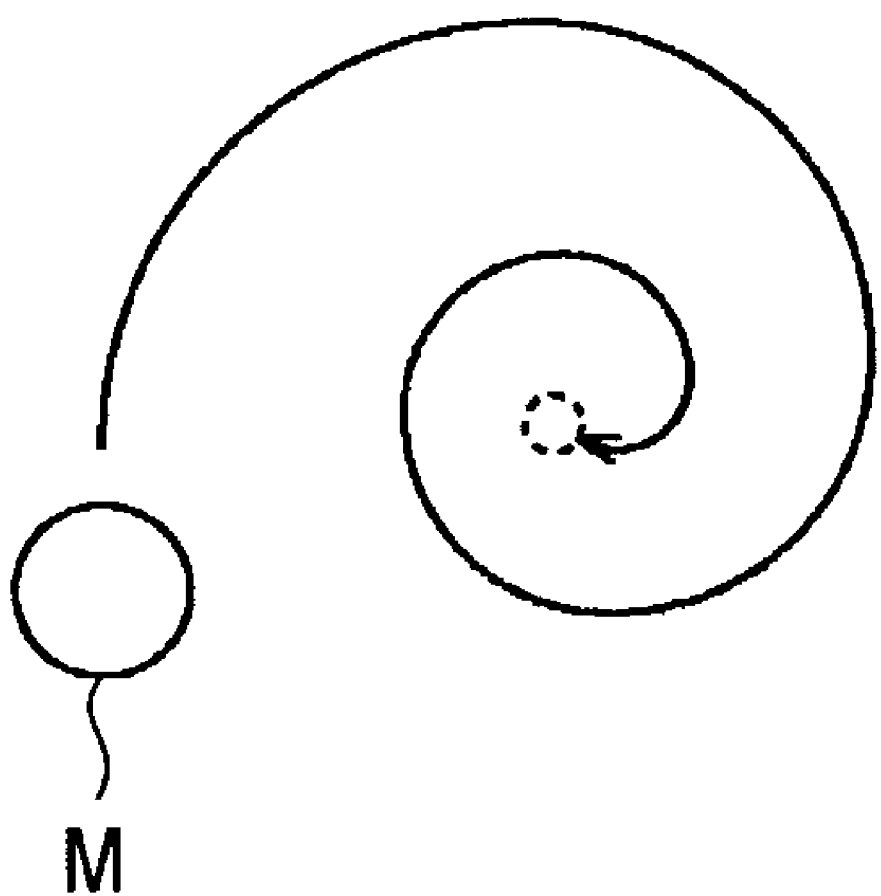
FIG. 13 is a display example of the message object.

In the examples shown in FIGS. 10 and 12, the message object M moves upward while being swayed horizontally as time passes. However, as shown in FIG. 13, the message object M may be moved spirally toward a predetermined center. Also, in this case, the diameter of the message object M may be decreased or the transparency of the outline of the message object M may be gradually increased as the message object M approaches the center so that the user cannot see the message object M when it finally reaches the center.

Furthermore, although not shown, the message object M may be displayed at the right or left end of the communication page first and then moved to the left or right end as time passes. Alternatively, contrary to the example shown in FIG. 10, the message object may be displayed at the top of the communication page first and then moved downward as time passes.

Also, the elapse of the time may be represented by varying the color or the shape of the object, instead of by the movement thereof.

Figure 14:
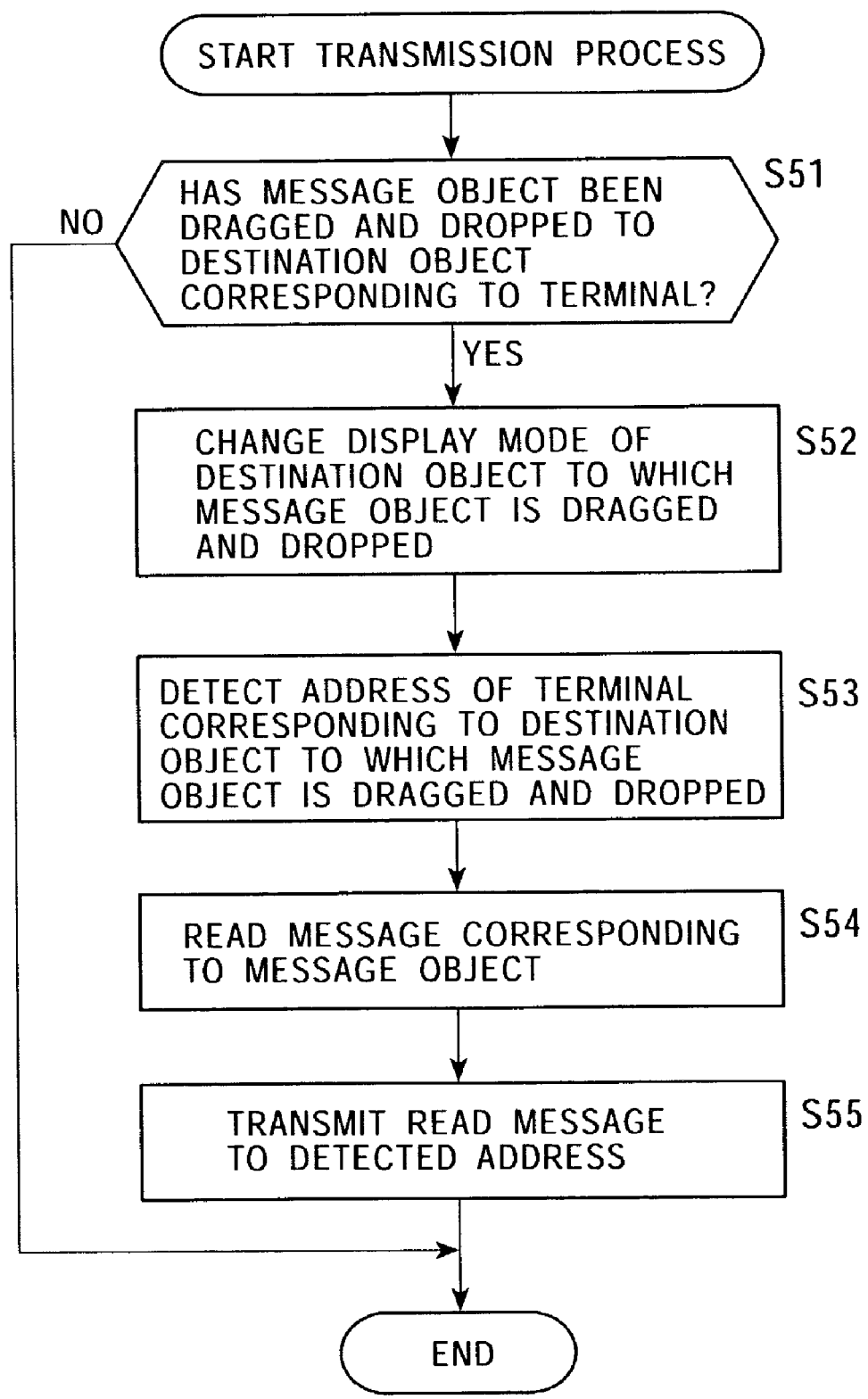
FIG. 14 is a flowchart for illustrating a transmission process.

Next, a process of transmitting a voice signal associated with the message object M (step S30 of FIG. 7) to a predetermined terminal 2 will be described with reference to the flowchart in FIG. 14.

In step S51, the CPU 11 of the terminal 1 determines whether or not the operation unit 17 is operated so that one of the message objects M displayed in the communication page (moving upward like a bubble) has been selected and has been dragged and dropped to the destination object 51 corresponding to the terminal 2. When it is determined that the message object M has been dragged and dropped, the process proceeds to step S52.

In step S52, the CPU 11 controls the display unit 19 so as to detect the destination object 51 to which the message object M has been dragged and dropped and changes the display mode.

Figure 15:
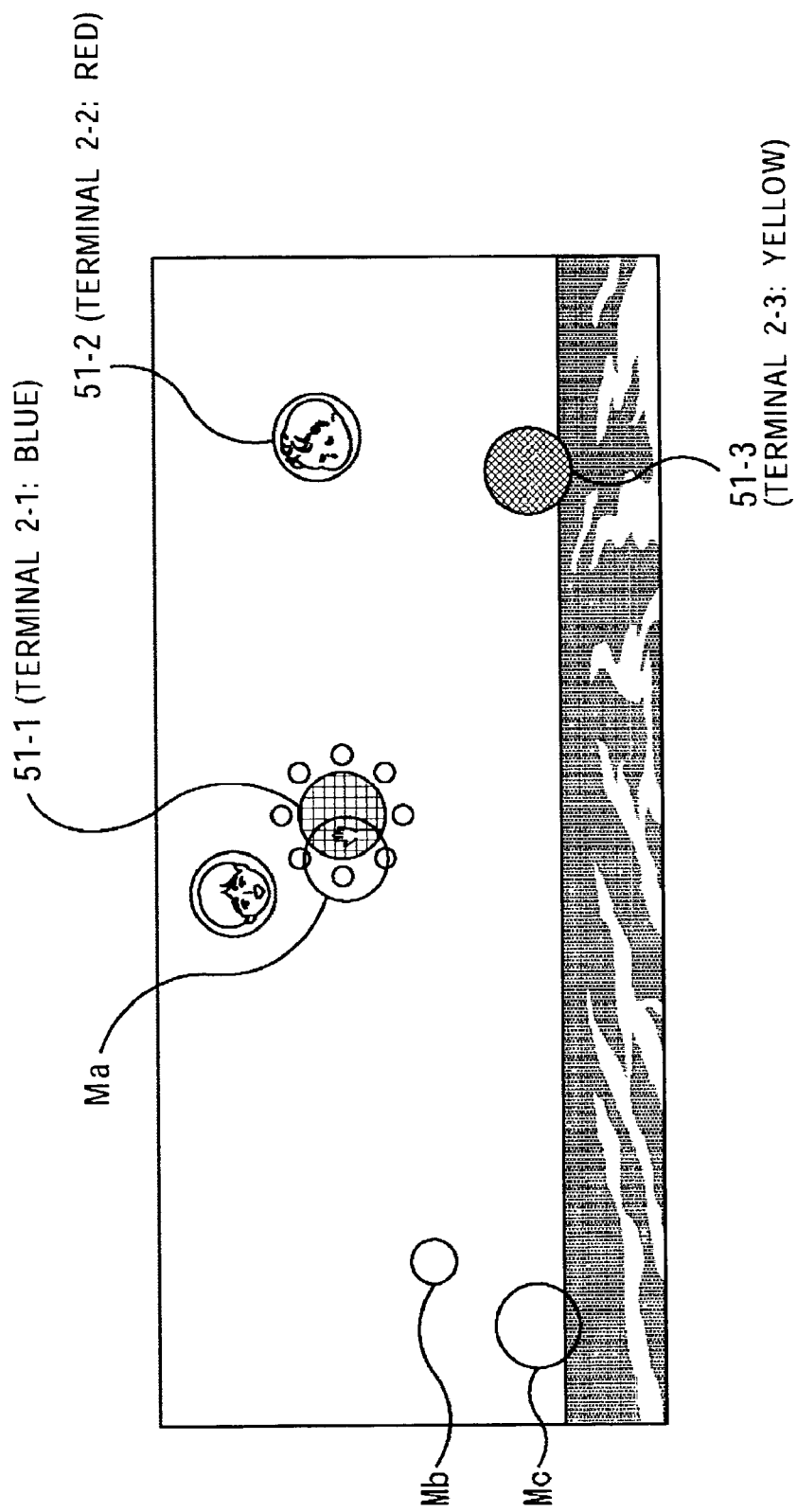
FIG. 15 shows another display example of the communication page.

For example, as shown in FIG. 15, when the message object Ma is dragged and dropped to the destination object 51-1, the destination object 51-1 is surrounded by small circles. Also, by storing image data of the face of the user of the terminal 2-1 corresponding to the destination object 51-1 in advance, the image may be displayed. The image of the face may be displayed such that it moves upward like a bubble and may disappear when it reaches the top of the display.

In step S53, the CPU 11 detects the address of the terminal 2 corresponding to the destination object 51 to which the message object M has been dragged and dropped from the registration management table stored in the hard disk 14.

Then, in step S54, the CPU 11 reads out voice data associated with the message object M which is selected so as to be dragged and dropped to the destination object 51 in step S51.

In step S55, the CPU 11 controls the communication unit 21 so as to transmit the voice data read out in step S54 to the terminal 2 having the address detected in step S53.

When it is determined that the message object M has not been dragged and dropped to the destination object 51 in step S51, or when the voice data is transmitted to the terminal 2 in step S55, the process is completed.

The above-described transmission process is repeatedly performed with a predetermined timing.

Figure 16:
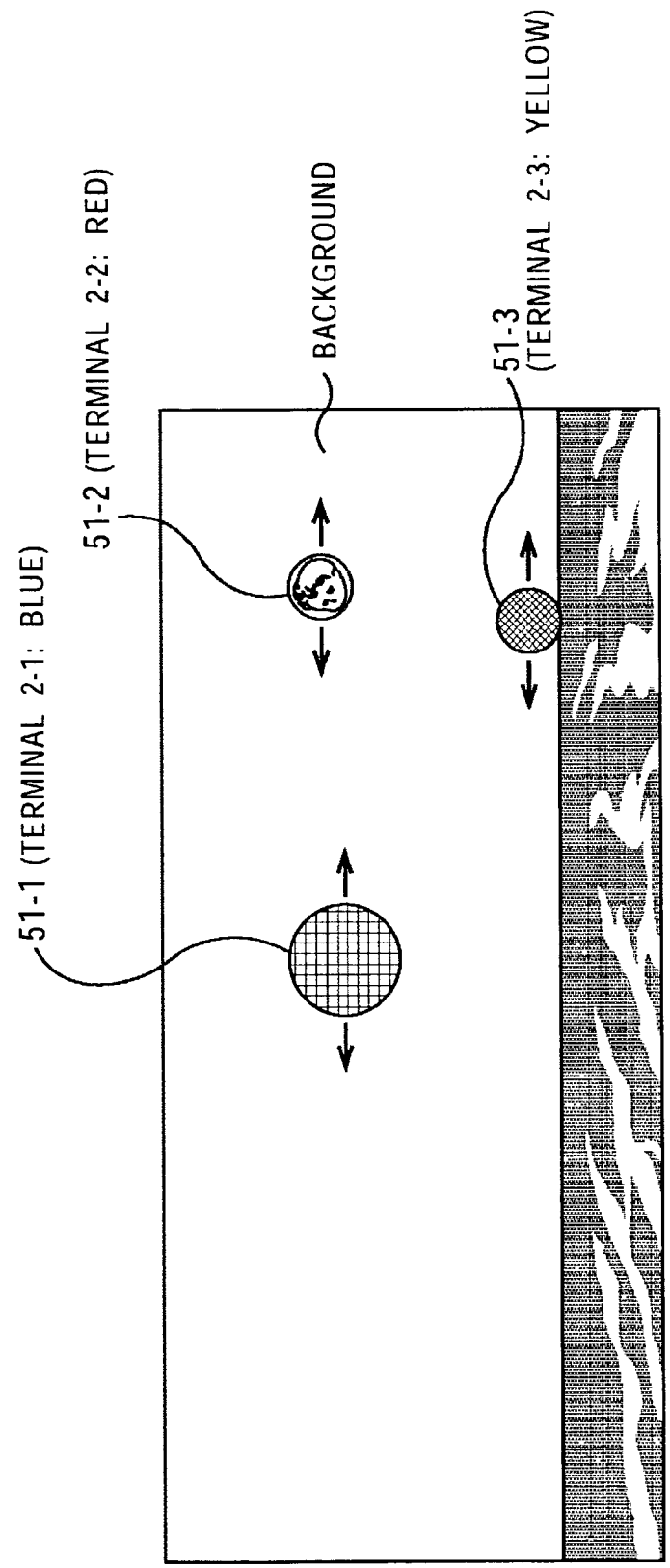
FIG. 16 shows another display example of the communication page.

When the display mode of the destination object 51 corresponding to the terminal 2 (user) to which a message is transmitted frequently is made different from that of the destination object 51 corresponding to the terminal 2 to which a message is transmitted less frequently, the user can recognize a closer communication partner by seeing the display mode of the destination object 51. Thus, for example, when the user transmits a message to the terminal 2-1 frequently but does not transmit a message to the terminals 2-2 and 2-3 frequently, the size of the destination object 51-1 corresponding to the terminal 2-1 may be increased and the size of the destination objects 51-2 and 51-3 corresponding to the terminals 2-2 and 2-3 may be decreased, as shown in FIG. 16.

In the above description, input and transmission of a message in the terminal 1 has been mainly described. Hereinafter, the operation of the terminal 1 for receiving a message transmitted from the terminal 2 will be described with reference to the flowchart in FIG. 17.

In step S61, the CPU 11 of the terminal 1 determines whether or not a message (for example, voice data) from the terminal 2 has been received. If it is determined that the message has been received, the process proceeds to step S62.

In step S62, the CPU 11 detects the destination object 51 of the terminal 2, which is a transmitter of the message received in step S61. Then, in step S63, the CPU 11 controls the display unit 19 so as to change the display mode of the destination object 51.

Figure 18:
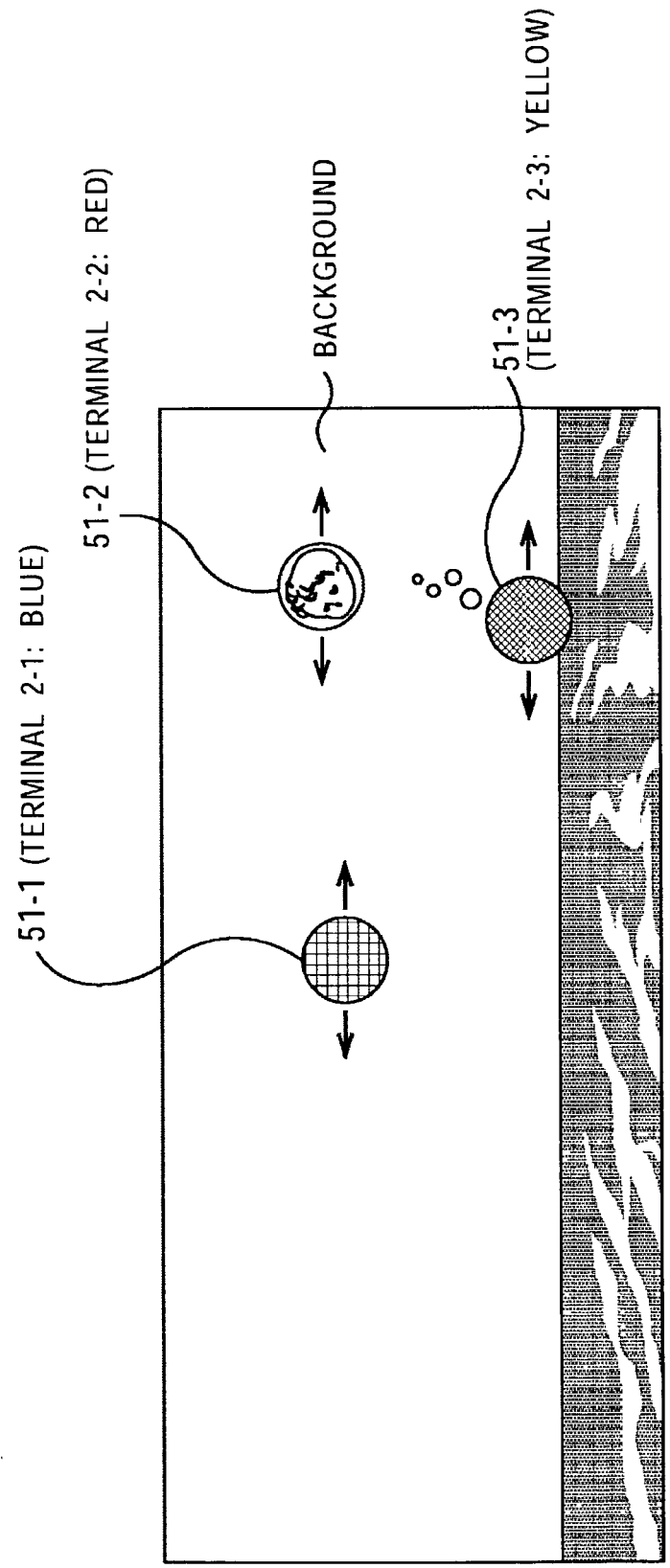
FIG. 18 shows another display example of the communication page.
Figure 19:
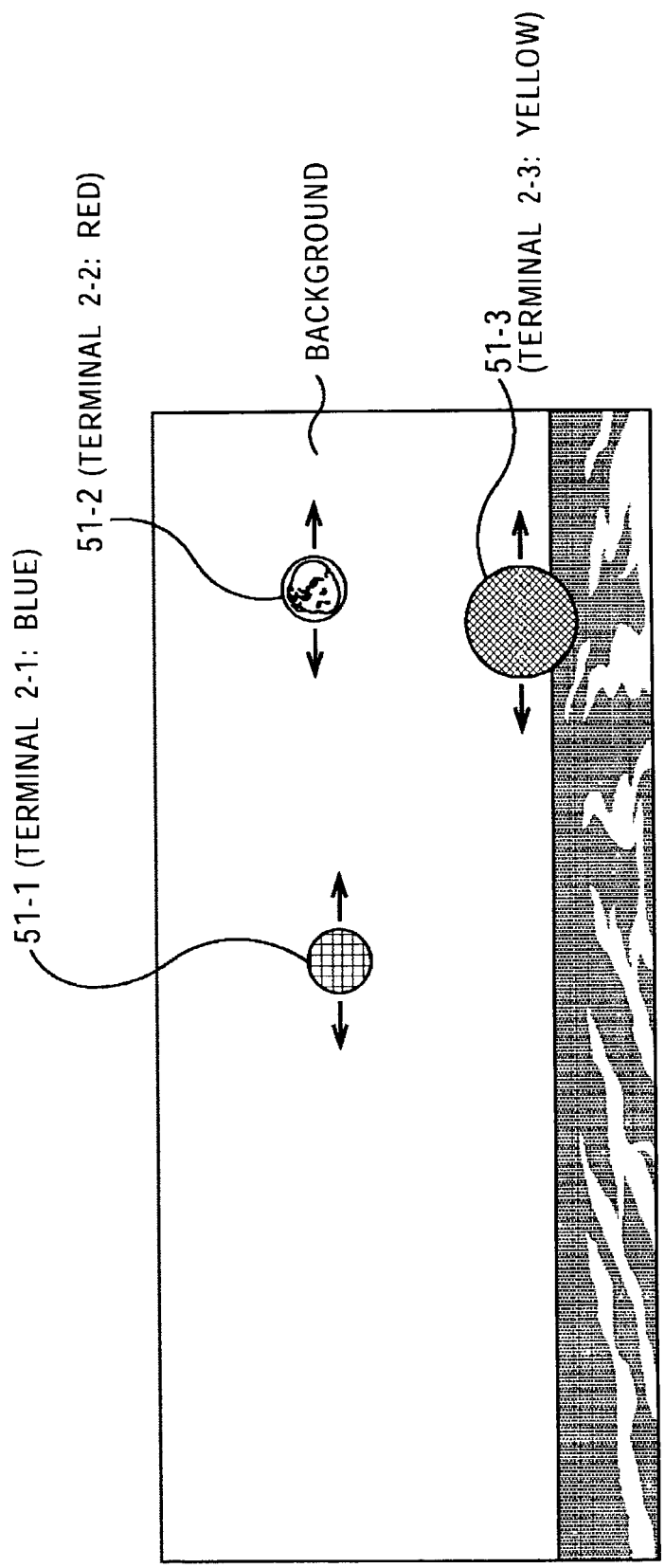
FIG. 19 shows another display example of the communication page.

For example, when a message from the terminal 2-3 is received, the destination object 51-3 corresponding to the terminal 2-3 is displayed such that it generates small bubbles, as shown in FIG. 18. Accordingly, the user can recognize that a message has been transmitted from the terminal 2-3. If the message from the terminal 2-3 is reproduced by a reproducing process (described later), the display mode of the destination object 51-3 is returned to an original mode.

Then, in step S64, the CPU 11 associates the message received in step S61 with the destination object 51 detected in step S62. Specifically, the name of the file containing the received message is set in the registration management table (FIG. 6), corresponding to the ID of the destination object 51.

When it is determined that no message has been received in step S61 or when the message is associated with the destination object 51 and is stored in step S64, the process is completed. This reception process is repeatedly performed with a predetermined timing.

When the display mode of the destination object 51 corresponding to the terminal 2 (user) from which a message is received frequently is made different from that of the destination object 51 corresponding to the terminal 2 from which a message is received less frequently, the user can recognize a closer communication partner. Thus, for example, when the terminal 2-3 transmits a message to the terminal 1 more frequently than the terminals 2-1 and 2-2, the size of the destination object 51-3 corresponding to the terminal 2-3 may be increased and the size of the destination objects 51-1 and 51-2 corresponding to the terminals 2-1 and 2-2 may be decreased.

Furthermore, the display mode of the destination object 51 can be changed in accordance with the number of messages which are not reproduced. For example, the moving speed of the small bubbles of the destination object 51-3 shown in FIG. 18 can be increased. Accordingly, the user can recognize that many unopened messages are accumulated.

Figure 20:
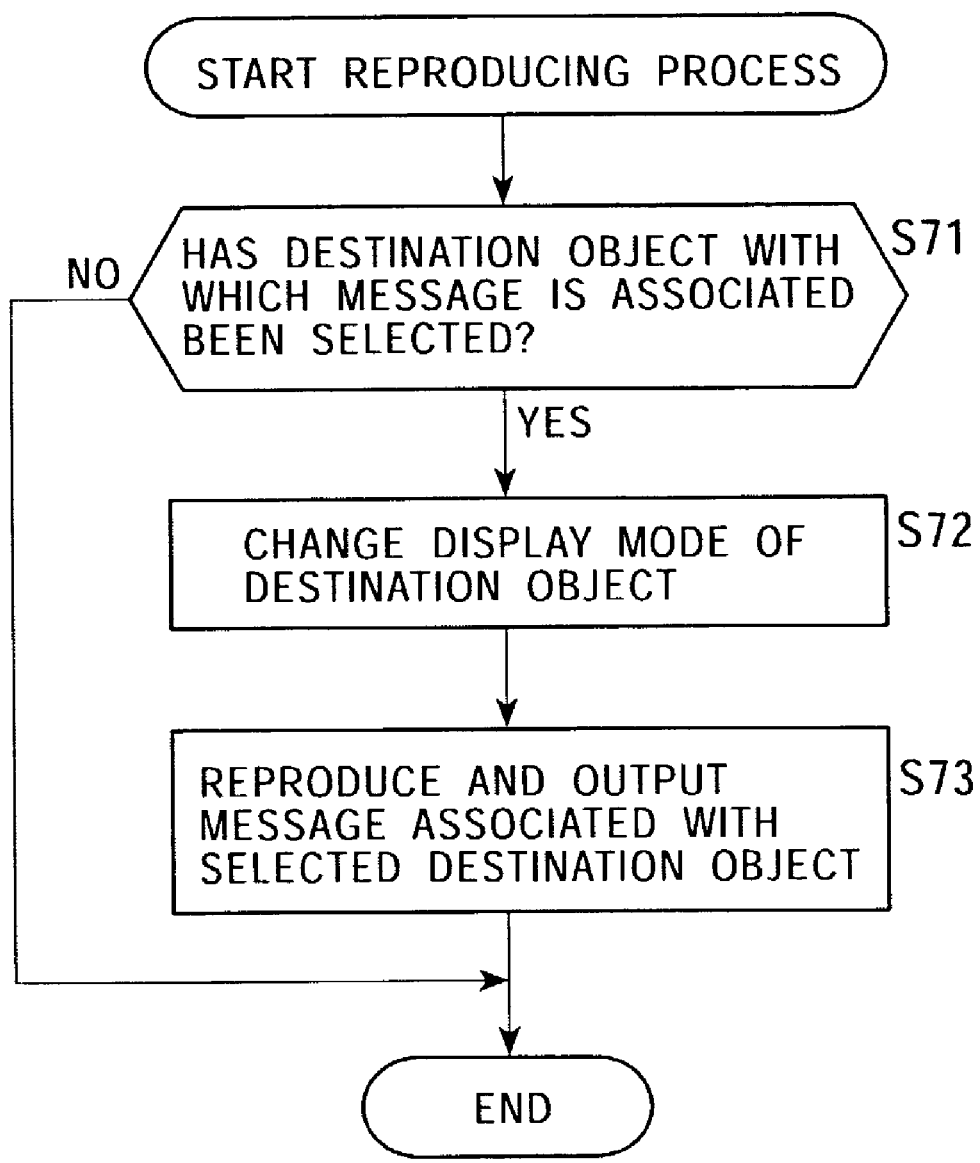
FIG. 20 is a flowchart for illustrating a reproducing process.

Next, the operation of the terminal 1 for reproducing the message received in the process shown in FIG. 17 will be described with reference to the flowchart in FIG. 20.

Figure 17:
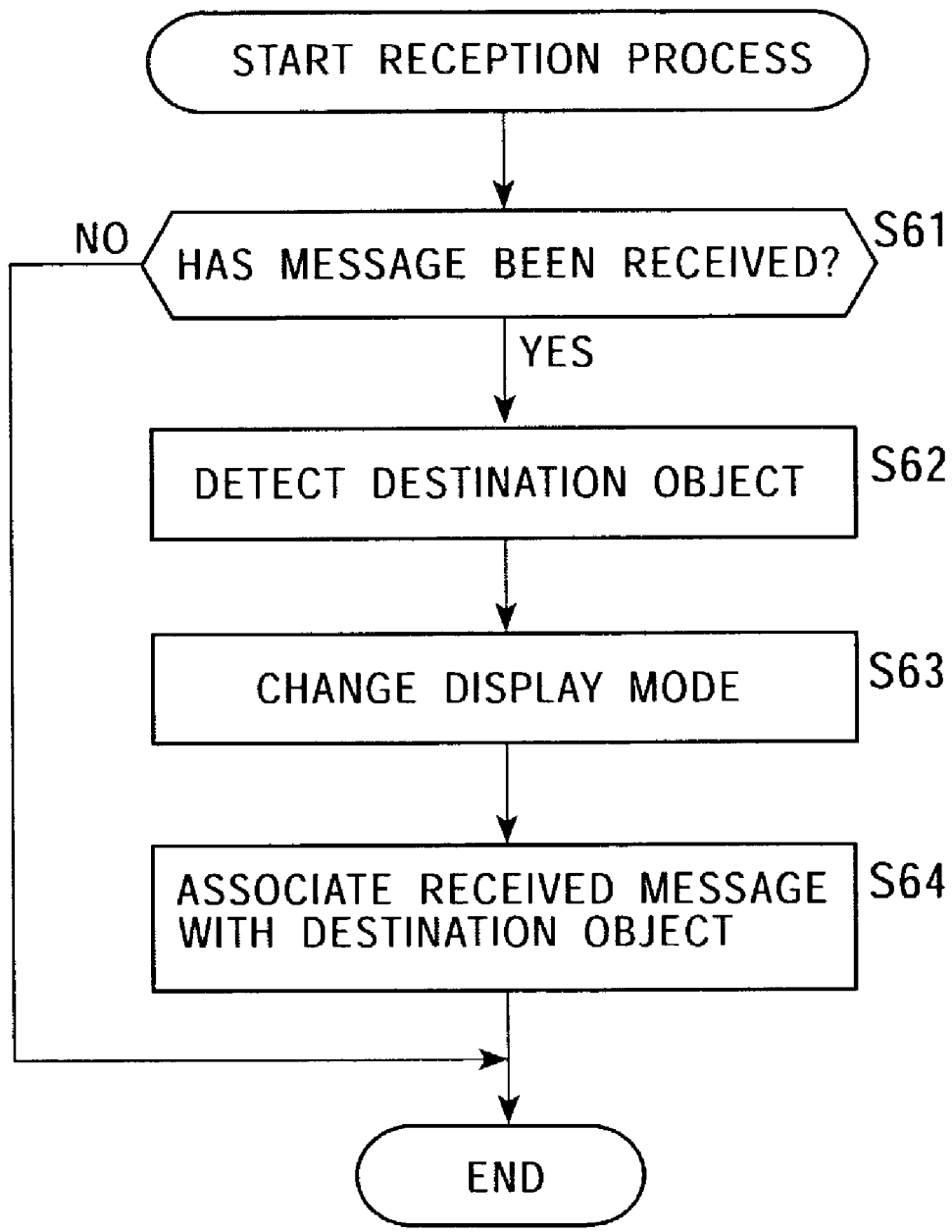
FIG. 17 is a flowchart for illustrating a reception process.

In step S71, the CPU 11 of the terminal 1 determines whether or not the operation unit 17 is operated so that the destination object 51 with which the message is associated in step S64 of FIG. 17 has been selected. If it is determined that the destination object 51 has been selected, the process proceeds to step S72, where the display unit 19 is controlled so as to change the display mode of the selected destination object 51.

Figure 21:
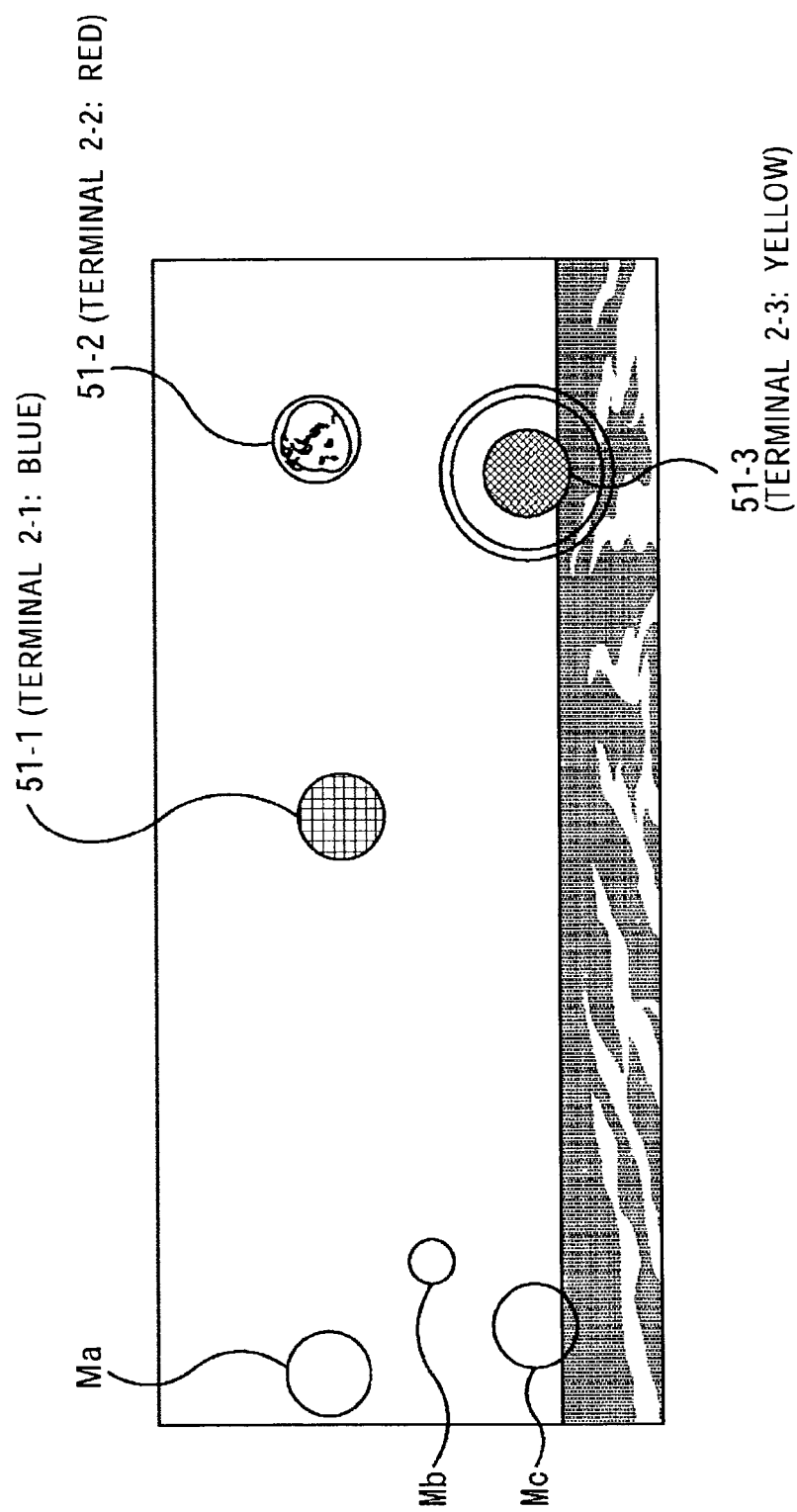
FIG. 21 shows another display example of the communication page.

For example, when the destination object 51-3 corresponding to the terminal 2-3 is selected, the outline of the destination object 51-3 is extended, as shown in FIG. 21.

Then, in step S73, the CPU 11 reads out the voice data stored in the file whose name is set in the registration management table stored in the hard disk 14, the name of the file being associated with the address of the selected destination object 51. Then, the CPU 11 reproduces the voice data so as to be output from the speaker 20. Then, the process is completed.

The above-described reproducing process is repeatedly performed with a predetermined timing.

Figure 22:
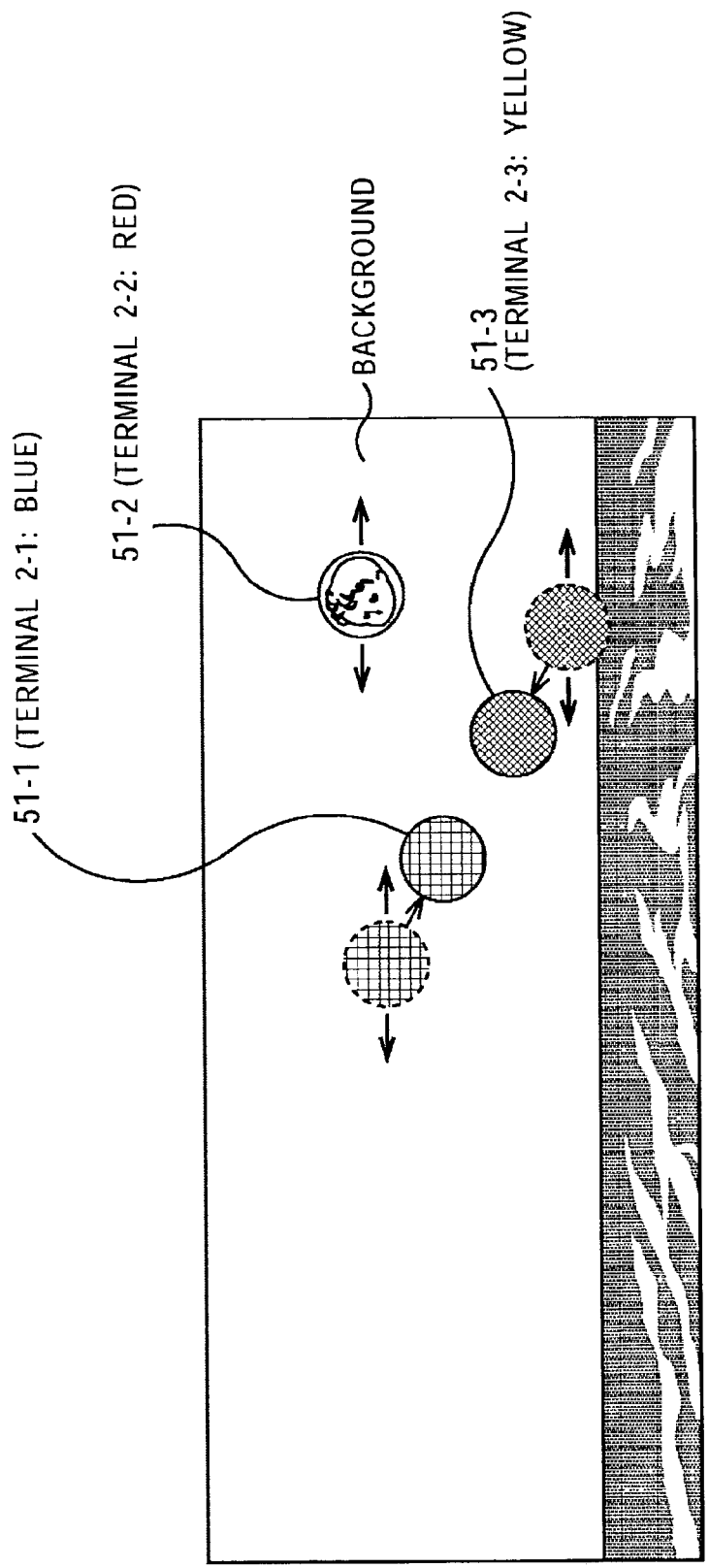
FIG. 22 shows another display example of the communication page.

In the above description, cases where the terminal 1 transmits and receives a message are described. For example, when the terminal 2-1 communicates with the terminal 2-3, the destination objects 51-1 and 51-3 in the communication page of the terminal 1 may be moved in the direction of the arrows so that they approach each other, as shown in FIG. 22. Accordingly, the user can ambiguously recognize that the terminal 2-1 is communicating with the terminal 2-3.

Figure 23:
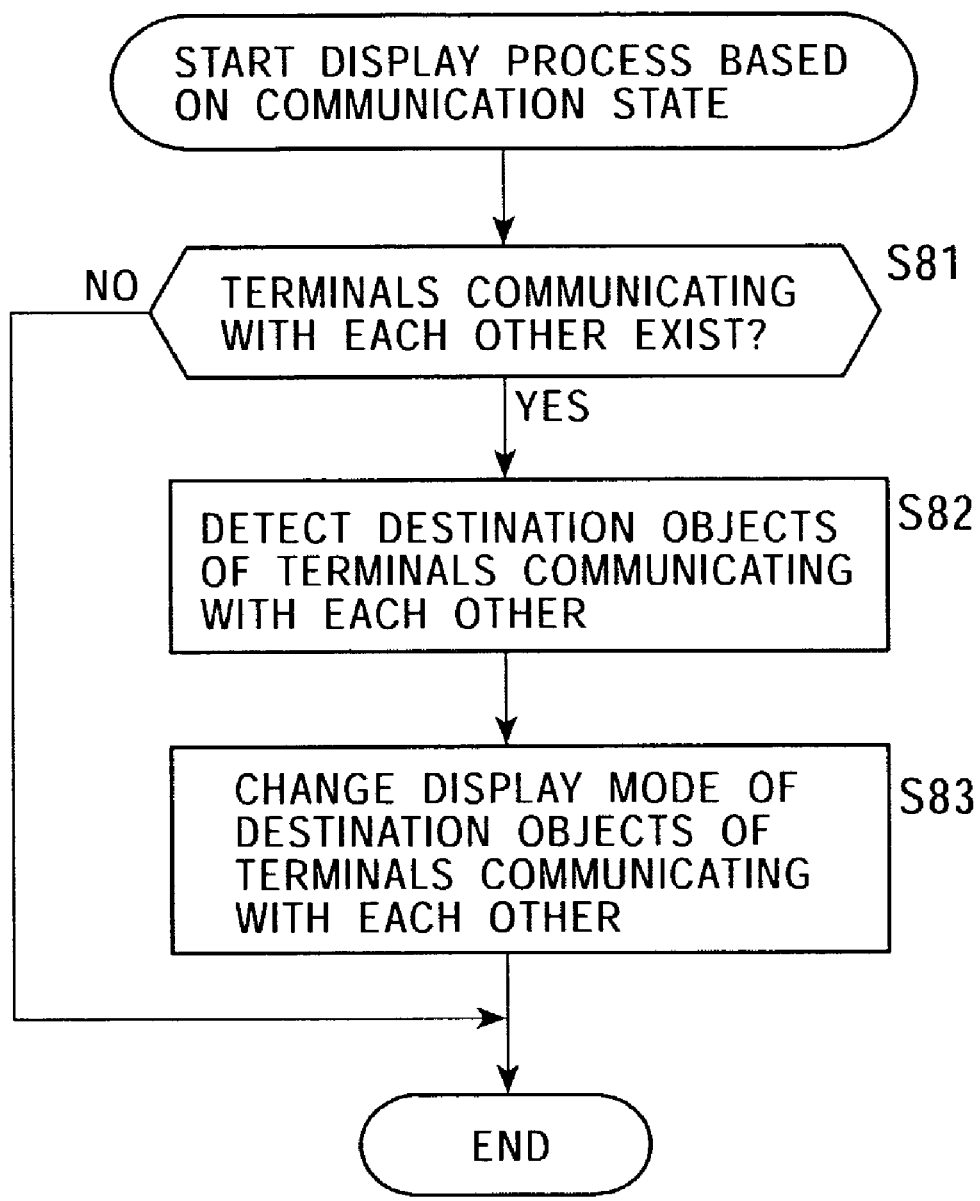
FIG. 23 is a flowchart for illustrating a display process based on a communication status.

The flowchart in FIG. 23 shows the operation of the terminal 1 for displaying the destination objects 51 in accordance with the communication status of the terminals 2 which communicate with each other, as shown in FIG. 22.

In step S81, the CPU 11 of the terminal 1 determines whether or not there are terminals 2 communicating with each other. When it is determined that there are terminals 2 communicating with each other, the process proceeds to step S82, where the destination objects 51 corresponding to the terminals 2 which are communicating with each other are detected.

Then, in step S83, the CPU 11 of the terminal 1 controls the display unit 19 so that the destination objects corresponding to the terminals 2 detected in step S82 approach each other.

Then, the process is completed. The above-described display process is repeatedly performed with a predetermined timing.

Figure 24:
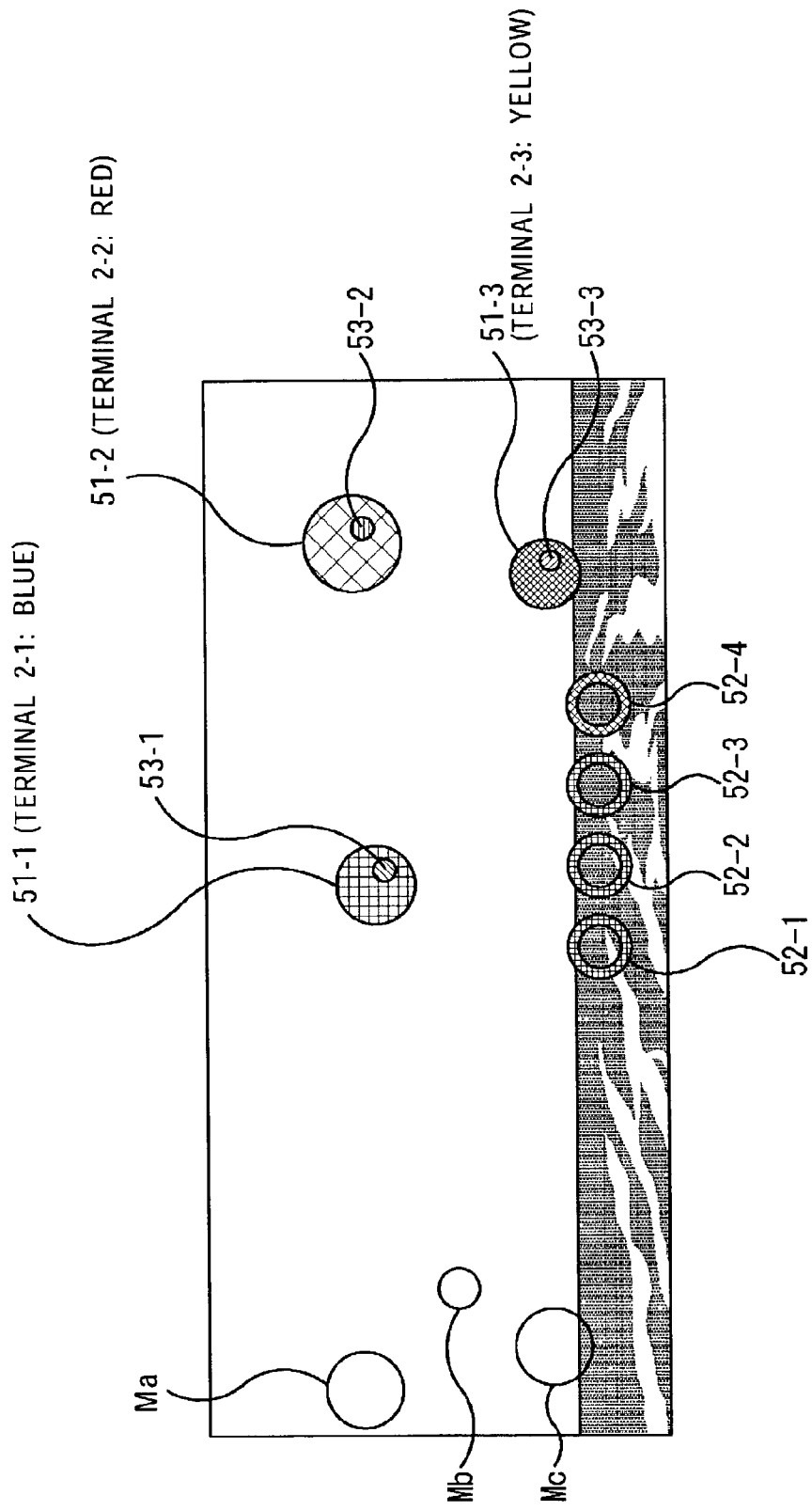
FIG. 24 shows another display example of the communication page.

FIG. 24 shows another display example of the communication page. In this communication page, four color palettes 52-1 to 52-4, each having a predetermined color, are provided.

As shown in FIG. 15, when a message is transmitted, a predetermined message object (message object Ma) is dragged and dropped to a desired destination object 51 (destination object 51-1). By dragging and dropping the message object M to a desired color palette 52 (52-1) before dragging and dropping it to the destination object 51-1, as shown in FIG. 25, color information (color information representing red) corresponding to the color pallet 52-1 is added to the message associated with the message object Ma.

Then, by dragging and dropping the message object Ma to the destination object 51-1, the message with color information can be transmitted to the terminal 2-1.

Figure 25:
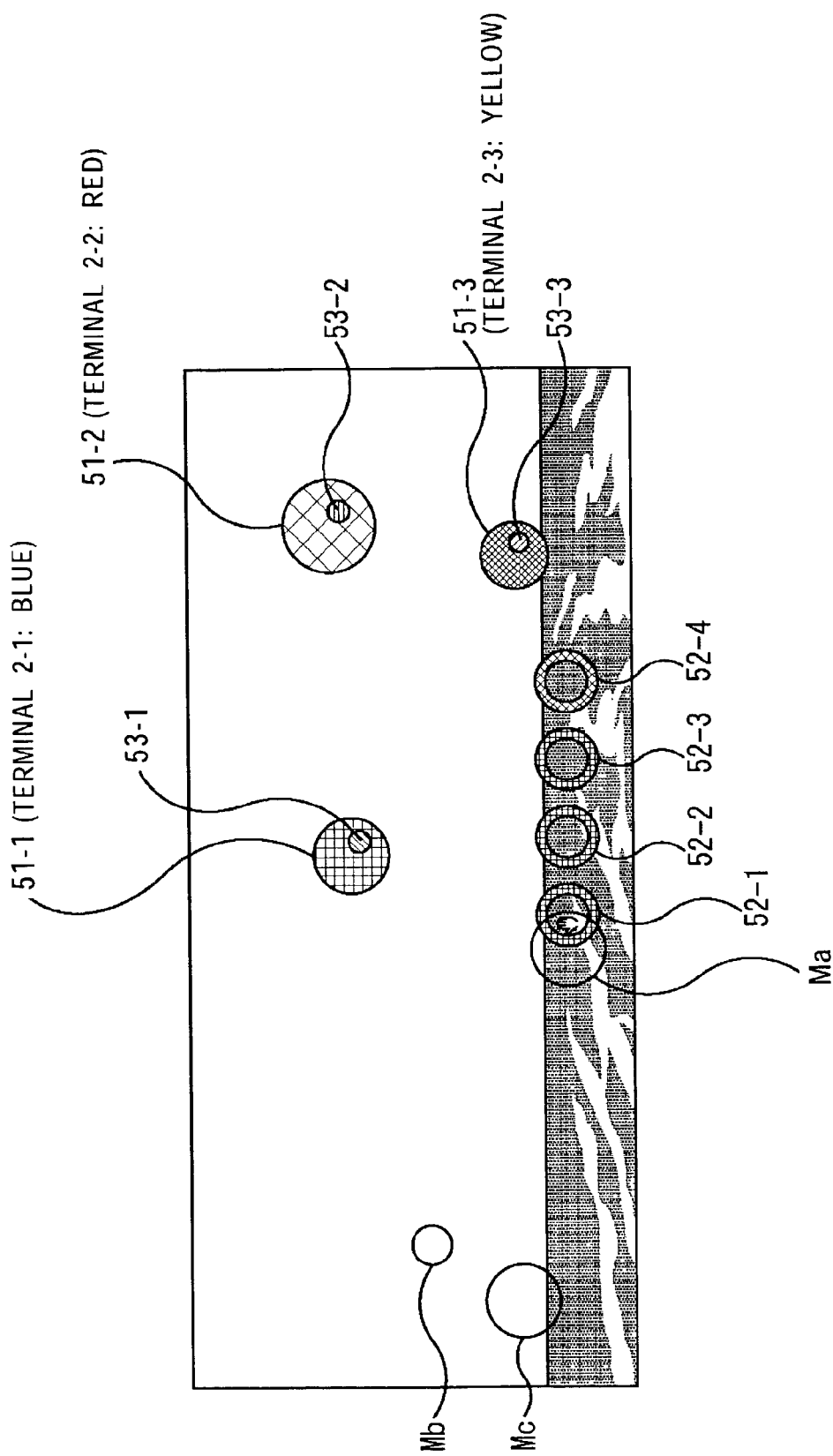
FIG. 25 shows another display example of the communication page.

Incidentally, a window 53 is provided to the destination object 51 in FIG. 25. The window 53 has a color corresponding to the color information which is added to the message from the terminal 2.

For example, when the communication page is displayed in the terminal 2-1 and when the user of the terminal 2-1 transmits a message of anger to the terminal 1, the user adds red color information to the message. Accordingly, in the communication page of the terminal 1 which receives the message, red is displayed in the window 53 of the destination object 51-1 corresponding to the terminal 2-1.

That is, the user of the terminal 2 can add his or her feeling to the message and can recognize the feeling of the user who has transmitted a message.

In the example shown in FIG. 25, color information is added to a message by using the color palette 52. For example, the speech of a user is analyzed, and then blue color information is added to the message when the speech contains more high-frequency components, and red color information is added to the message when the speech contains more low-frequency components. In this case, color information is obtained from a table holding color information for each frequency band or from a calculation result of a predetermined expression.

Also, effect information for processing a pattern or speech can be added, instead of color information.

Figure 26:
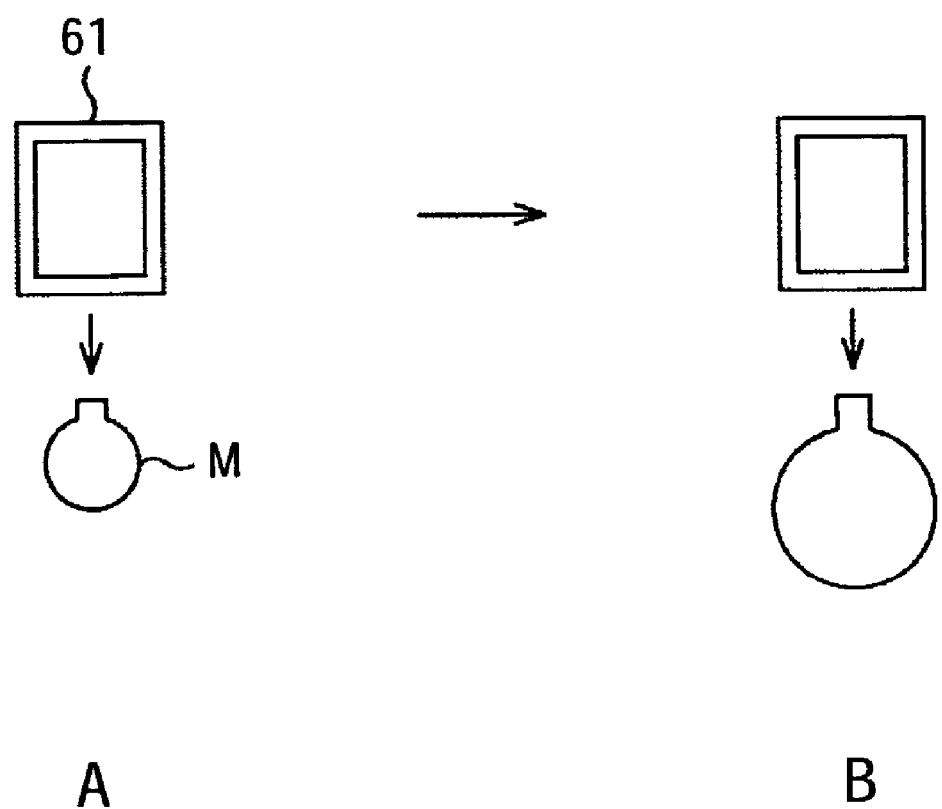
FIG. 26 shows a box to which text is input.

In the above description, a voice message is transmitted or received. Alternatively, text can be input so as to form a message. In this case, a box 61 and a message object M in the shape of a bottle, as shown in FIG. 26, are displayed in the communication page. A message can be formed by inputting characters into the box 61. The message object M becomes larger every time a character is input to the box 61.

In this case, too, by dragging and dropping the message object M, which has been formed in this way, to the destination object 51, the message can be transmitted to the terminal 2.

In the above description, the terminal 1 communicates with the terminal 2 by using its own communication page. Alternatively, the terminals 1 and 2 can login to a chat room provided on the Internet 3 and use a common communication page so as to communicate with each other.

In this case, an arbitrary color is distributed to the terminals 1 and 2 when the terminals 1 and 2 login to the chat room. For example, the destination object 51 of the terminal 2 having an arbitrary color is displayed in the communication page on the side of the terminal 1. When the window 52 is provided in the destination object 51, a color of initial value (for example, white) is displayed therein.

When the terminal 2, which is a chat partner, logs out, the destination object 51 of the terminal 2 disappears from the communication page on the side of the terminal 1.

The above-described series of processes can be executed by hardware or by software. When the series of processes are executed by software, a program constituting the software is installed from a program storage medium to a computer incorporated into a dedicated hardware or to a multi-purpose personal computer, which can perform various functions by installing various programs.

As a recording medium, following package media shown in FIG. 2 can be used: the magnetic disk 31, the optical disk 32, the magnetooptical disk (including a mini disk (MD)) 33, and a semiconductor memory 34, which are distributed to users to provide a program and which contains a program. Also, the ROM 12 or the hard disk 14 which is provided to the users such that it is incorporated into a computer in advance and which contains a program can be used.

In the specification, steps of the program provided through a recording medium may be performed in time-series in accordance with the described order. Alternatively, the steps may be performed in parallel or independently.

What is claimed is:

1. An information processing apparatus comprising:
   first detecting means for detecting input of first information;
   first display control means which displays a first object corresponding to the first information when the first detecting means detects input of the first information and which changes the display mode of the first object in accordance with the amount of data of the first information;
   second display control means for changing the display mode of the first object displayed by the first display control means in accordance with elapsed time from a predetermined time;
   first associating means for associating the first information with the first object; and
   transmitting means for transmitting the first information associated with the first object to a communication apparatus.

2. The information processing apparatus according to claim 1, wherein the first information is a voice signal captured by a microphone or text data input via an operation unit.

3. The information processing apparatus according to claim 1, further comprising:
   third display control means for displaying a second object corresponding to the communication apparatus; and
   second detecting means for detecting the second object to which the first object is dragged and dropped,
   wherein the transmitting means transmits the first information associated with the dragged and dropped first object to the communication apparatus corresponding to the second object detected by the second detecting means.

4. The information processing apparatus according to claim 3, wherein the third display control means displays the second object such that a color allocated with the communication apparatus is attached to the second object.

5. The information processing apparatus according to claim 3, further comprising:
   third detecting means for detecting a predetermined state of the communication apparatus,
   wherein the third display control means displays the second object in a display mode based on a detection result generated by the third detecting means.

6. The information processing apparatus according to claim 5, wherein the third detecting means detects whether or not the communication apparatus can communicate with the information processing apparatus.

7. The information processing apparatus according to claim 3, further comprising:
fourth display control means for displaying a third object corresponding to additional information; and
adding means which detects the third object to which the first object is dragged and dropped and which adds the additional information corresponding to the detected third object to the first information associated with the first object, which is dragged and dropped to the third object,
wherein the transmitting means transmits the first information associated with the first object and the additional information added thereto to the communication apparatus corresponding to the second object detected by the second detecting means.

8. The information processing apparatus according to claim 3, further comprising:
second associating means which receives second information transmitted from the communication apparatus and which associates the received second information with the second object corresponding to the communication apparatus which has transmitted the second information;
selecting means for selecting the second object corresponding to the communication apparatus; and
reproducing means for reproducing the second information associated with the second object selected by the selecting means.

9. The information processing apparatus according to claim 8, wherein the third display control means changes the display mode of the second object when the second information is associated with the second object by the second associating means.

10. The information processing apparatus according to claim 8, wherein the third display control means displays the second object in a display mode according to the number of times the second information is associated with the second object by the second associating means.

11. The information processing apparatus according to claim 8, wherein the third display control means displays the second object in a display mode according to the number of pieces of the second information which have not been reproduced by the reproducing means among the second information associated with the second object by the second associating means.

12. The information processing apparatus according to claim 3, further comprising:
communication status detecting means for detecting the communication status between the communication apparatus and another communication apparatus,
wherein the third display control means displays the second object in a display mode based on a detection result generated by the communication status detecting means.

13. An information processing method comprising:
a first detection-control step of controlling detection of input of first information;
a first display-control step of displaying a first object corresponding to the first information when input of the first information is detected in the first detection-control step and of changing the display mode of the first object in accordance with the amount of data of the first information;
a second display-control step of changing the display mode of the first object displayed in the first display-control step in accordance with elapsed time from a predetermined time;
a first associating step of associating the first information with the first object; and
a transmission-control step of controlling transmission of the first information associated with the first object to a communication apparatus.

14. The information processing method according to claim 13, further comprising:
a third display-control step of displaying a second object corresponding to the communication apparatus; and
a second detection-control step of detecting the second object to which the first object is dragged and dropped,
wherein, in the transmission-control step, the first information associated with the dragged and dropped first object is transmitted to the communication apparatus corresponding to the second object detected in the second detection-control step.

15. The information processing method according to claim 14, further comprising:
a fourth display-control step of displaying a third object corresponding to additional information; and
an adding step of detecting the third object to which the first object is dragged and dropped and of adding the additional information corresponding to the detected third object to the first information associated with the first object, which is dragged and dropped to the third object,
wherein, in the transmission-control step, the first information associated with the first object and the additional information added thereto are transmitted to the communication apparatus corresponding to the second object detected in the second detection-control step.

16. A program which allows a computer to execute a process comprising:
a detection-control step of controlling detection of input of first information;
a first display-control step of displaying a first object corresponding to the first information when input of the first information is detected in the detection-control step and of changing the display mode of the first object in accordance with the amount of data of the first information;
a second display-control step of changing the display mode of the first object displayed in the first display-control step in accordance with elapsed time from a predetermined time;
a first association-controlling step of associating the first information with the first object; and
a transmission-control step of controlling transmission of the first information associated with the first object to a communication apparatus.

* * * * *